US011530766B2

(12) United States Patent
Klein et al.

(10) Patent No.: US 11,530,766 B2
(45) Date of Patent: Dec. 20, 2022

(54) CONNECTOR

(71) Applicant: VOSS AUTOMOTIVE GMBH, Wipperfürth (DE)

(72) Inventors: Roland Klein, Wipperfürth (DE); Eugen Heinrichs, Bergneustadt (DE)

(73) Assignee: VOSS AUTOMOTIVE GMBH, Wipperfürth (DE)

( * ) Notice: Subject to any disclaimer, the term of this patent is extended or adjusted under 35 U.S.C. 154(b) by 449 days.

(21) Appl. No.: 16/318,596

(22) PCT Filed: Jul. 27, 2017

(86) PCT No.: PCT/EP2017/000907
§ 371 (c)(1),
(2) Date: Jan. 17, 2019

(87) PCT Pub. No.: WO2018/019421
PCT Pub. Date: Feb. 1, 2018

(65) Prior Publication Data
US 2019/0242510 A1 Aug. 8, 2019

(30) Foreign Application Priority Data
Jul. 29, 2016 (DE) .......................... 102016009168.1

(51) Int. Cl.
*F16L 37/14* (2006.01)
*F16L 37/098* (2006.01)

(52) U.S. Cl.
CPC ......... *F16L 37/144* (2013.01); *F16L 37/0985* (2013.01); *F16L 37/0987* (2013.01); *F16L 2201/10* (2013.01)

(58) Field of Classification Search
CPC ......... F16L 37/00; F16L 37/098; F16L 37/12; F16L 37/148; F16L 37/121; F16L 37/123;
(Continued)

(56) References Cited

U.S. PATENT DOCUMENTS 4,915,421 A 4/1990 Dennany Jr.
5,924,746 A 7/1999 Fixemer
(Continued)

FOREIGN PATENT DOCUMENTS

DE 8604217 U1 6/1988
DE 3924173 A1 1/1991
(Continued)

*Primary Examiner* — Aaron M Dunwoody
(74) *Attorney, Agent, or Firm* — Hudak, Shunk & Farine Co. LPA

(57) ABSTRACT

A connector, having a socket part and a plug part being insertable into a socket section of the socket part, wherein the plug part is provided with a retaining element for detachably retaining the plug part in the socket part, the retaining element having a retaining arm with at least one outwardly projecting engaging catch, a free end, and an end secured to the retaining element body and can be spring-elastically moved in the radial direction in relation to the plug part for blocking the engaging catch on a blocking surface or a blocking opening of the socket part and releasing it from same, and a locking device being provided for securing the blocking status of the plug part and socket part and for indicating an incorrect assembly thereof, the locking device cooperating with the retaining element, and being a radially insertable locking element that cooperates with the retaining element in the region of the retaining arm thereof.

25 Claims, 17 Drawing Sheets

(58) Field of Classification Search
CPC ..... F16L 37/133; F16L 37/138; F16L 37/144;
F16L 2201/10
USPC .................................................. 285/81, 82
See application file for complete search history.

(56) References Cited

U.S. PATENT DOCUMENTS

| | | |
|---|---|---|
| 6,419,281 B1 | 7/2002 | Salomon-Bahls et al. |
| 6,688,654 B2 | 2/2004 | Romero |
| 7,874,595 B2 | 1/2011 | Lechner et al. |
| 2008/0252071 A1* | 10/2008 | Lechner ................ F16L 37/133 |
| | | 285/319 |
| 2009/0035055 A1 | 2/2009 | Rosch et al. |
| 2016/0245441 A1 | 8/2016 | Klein et al. |

FOREIGN PATENT DOCUMENTS

| | | |
|---|---|---|
| DE | 20213806 U1 | 1/2004 |
| DE | 102004052538 A1 | 5/2006 |
| DE | 102004053538 A1 | 5/2006 |
| DE | 102009019395 A1 | 11/2010 |
| DE | 102014211844 A1 | 12/2015 |
| EP | 0999398 A1 | 5/2000 |
| EP | 1106896 A1 | 6/2001 |
| EP | 0946841 B1 | 5/2002 |
| EP | 1369634 A1 | 10/2003 |
| EP | 2224156 A2 | 9/2010 |
| FR | 2930621 A1 | 10/2009 |
| WO | 8909361 | 10/1989 |
| WO | 2015058857 A2 | 4/2015 |
| WO | 2015180875 A1 | 12/2015 |

\* cited by examiner

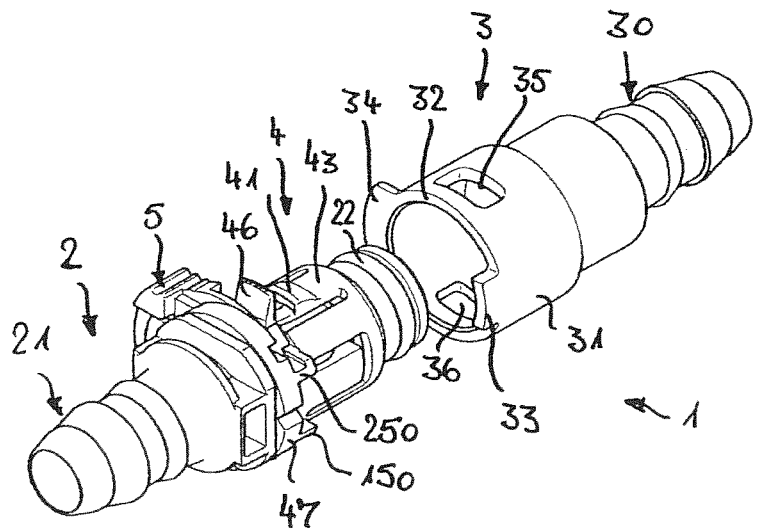
*Fig.1*
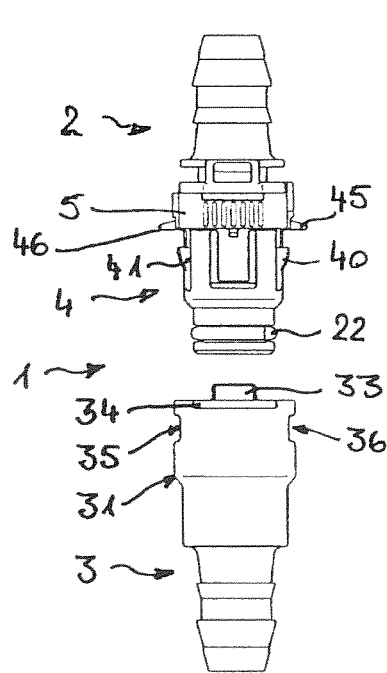
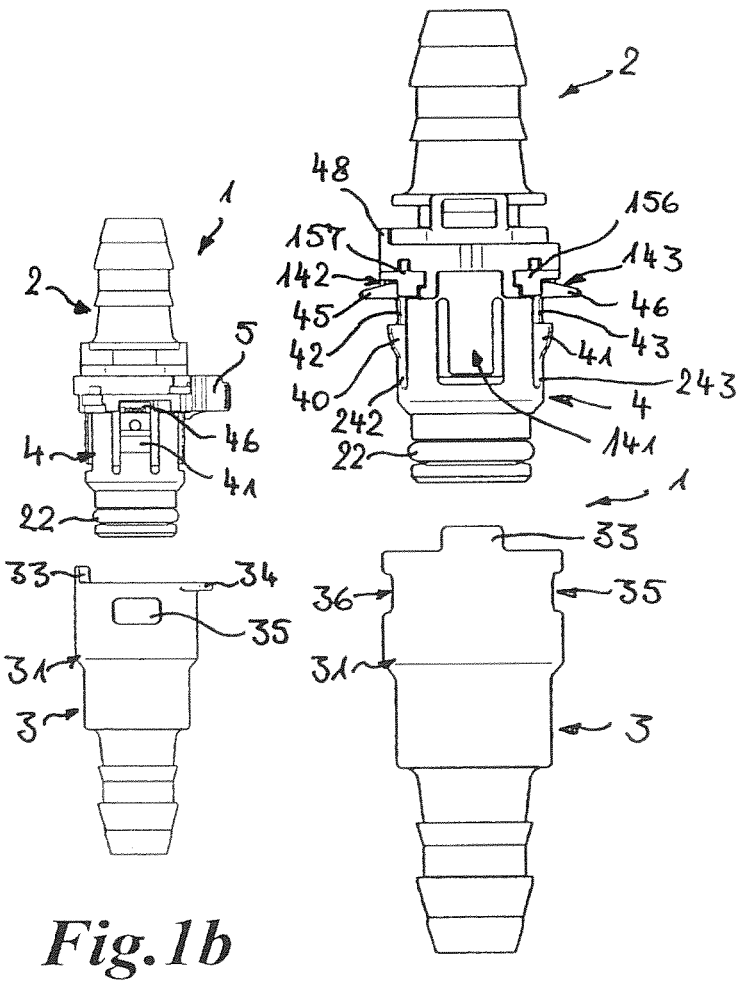
*Fig.1a*     *Fig.1b*     *Fig.1c*

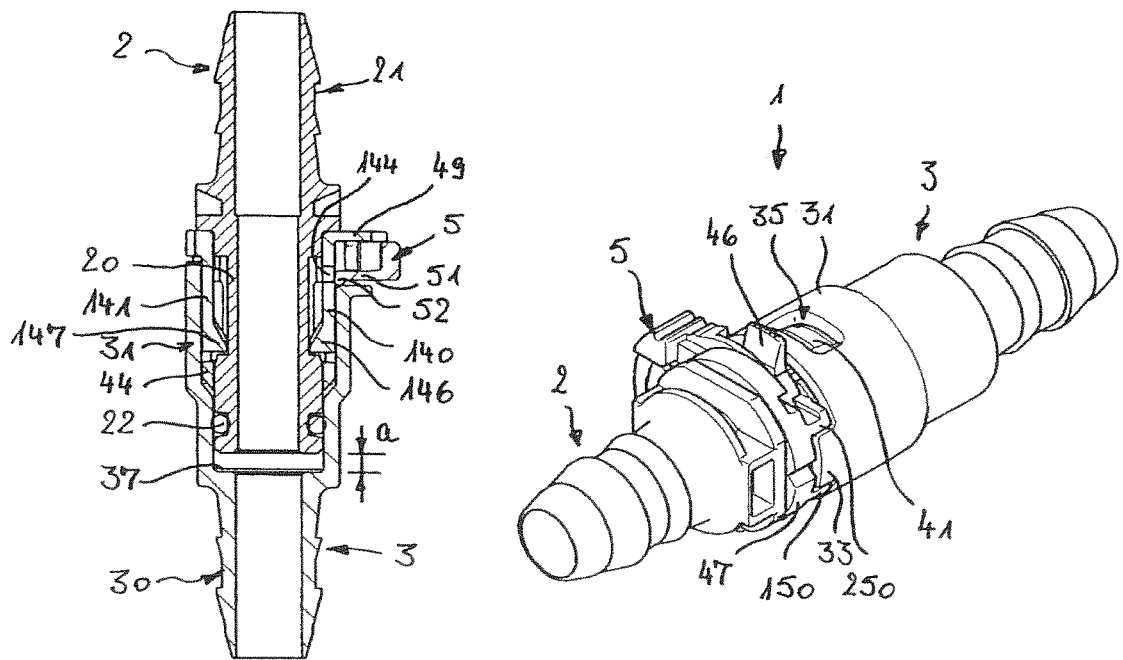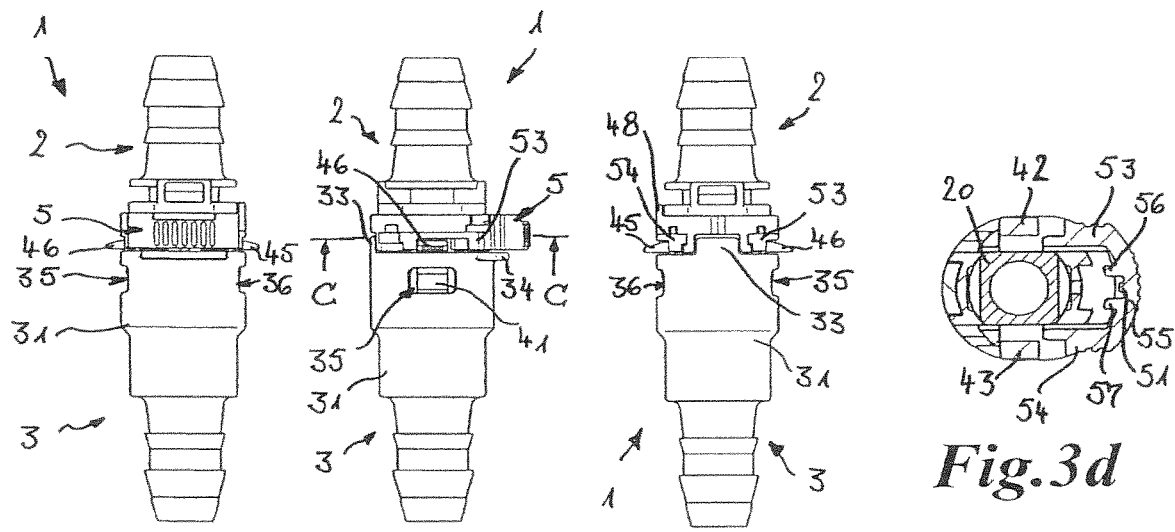

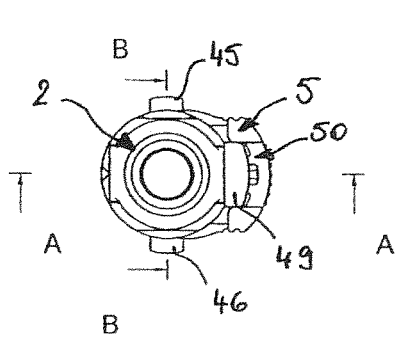
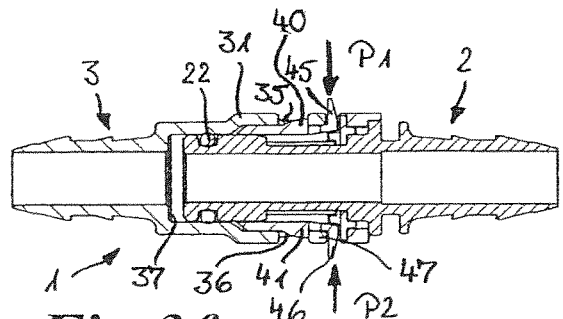
Fig.3e    Fig.3f
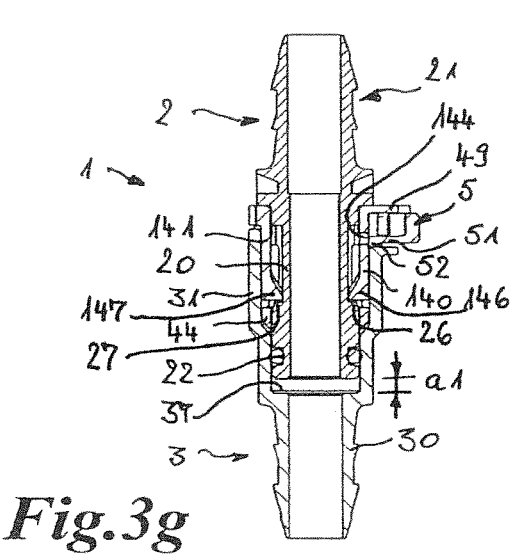
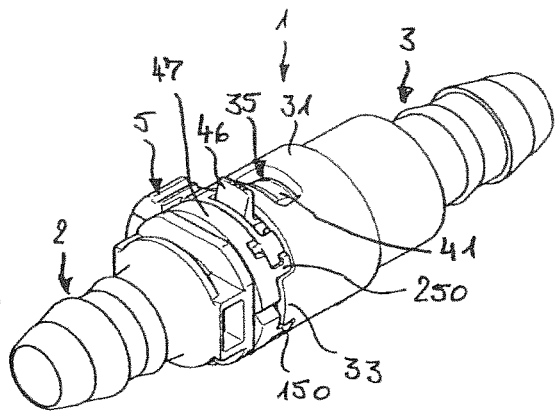
Fig.3g    Fig.4
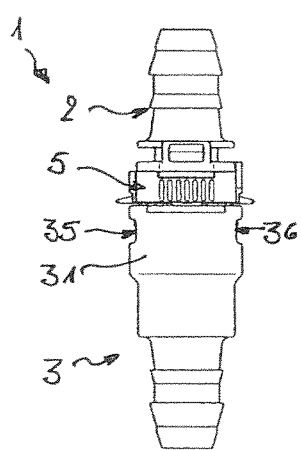 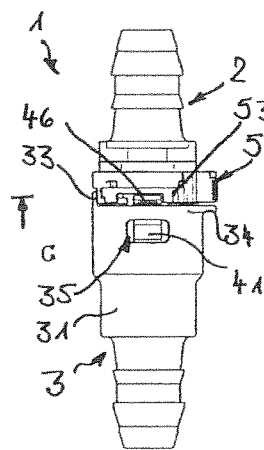 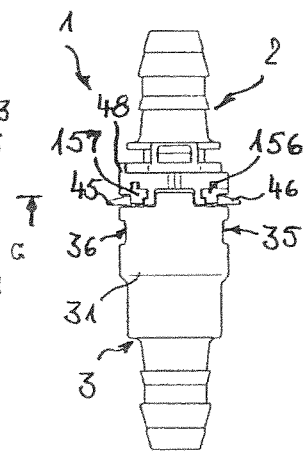 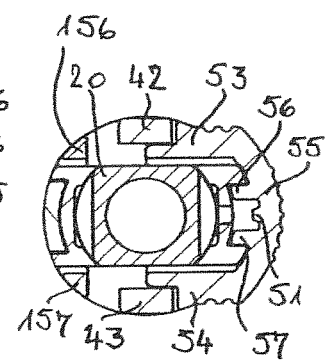
Fig.4a    Fig.4b    Fig.4c    Fig.4d

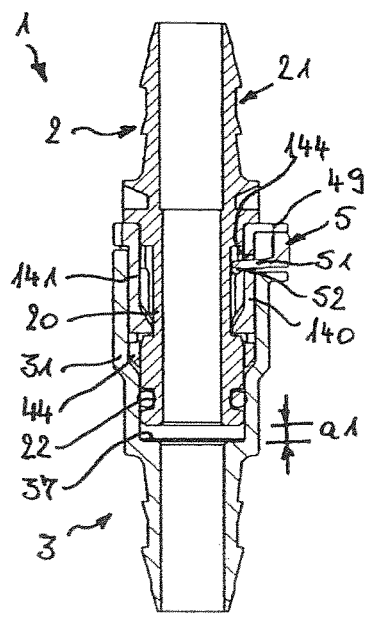
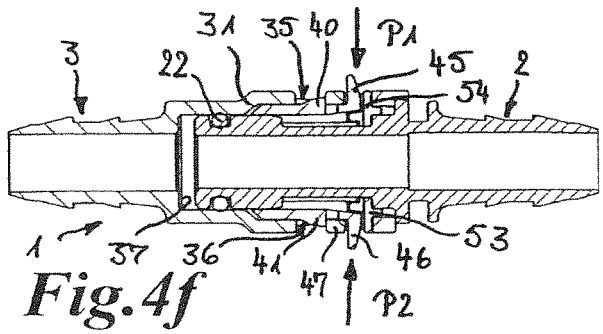
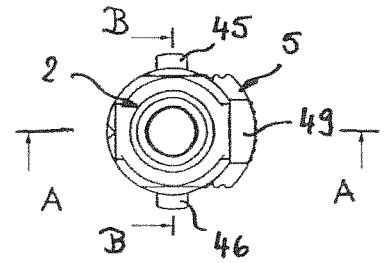
Fig.4g  Fig.4f  Fig.4e
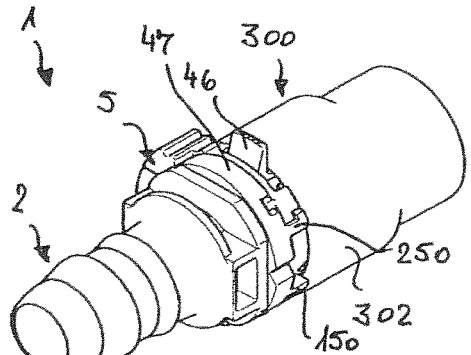
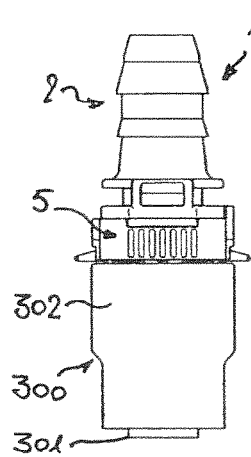
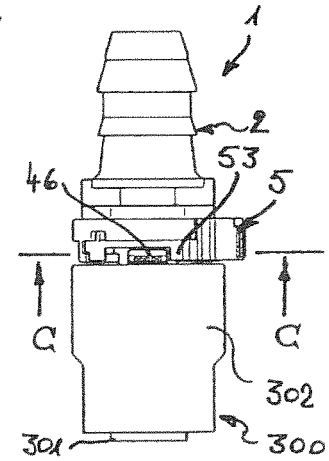
Fig.5  Fig.5a  Fig.5b
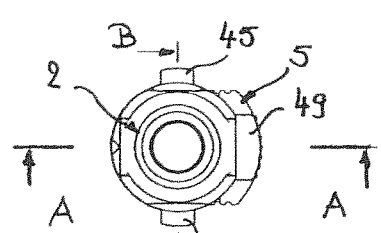
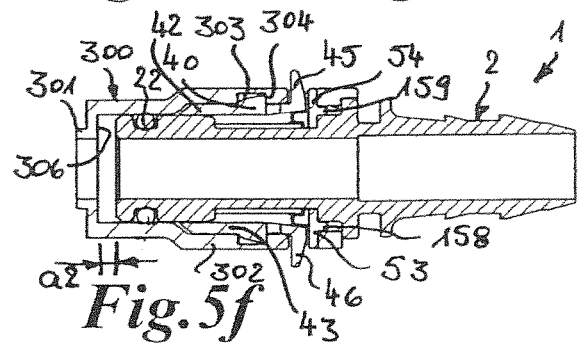
Fig.5e  Fig.5f

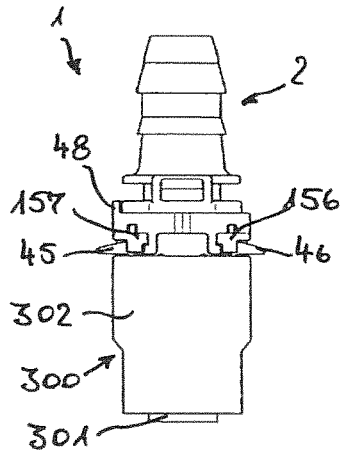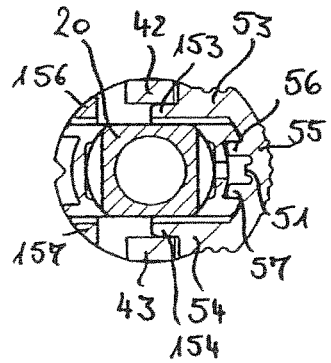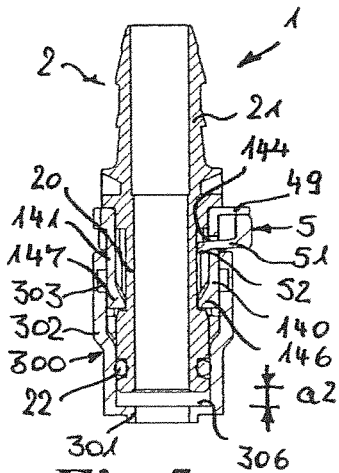
*Fig.5c*  *Fig.5d*  *Fig.5g*
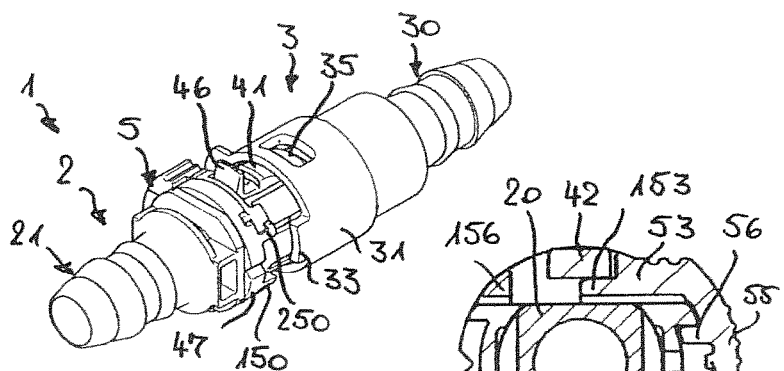
*Fig.6*
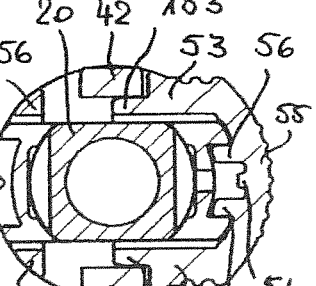
*Fig.6d*
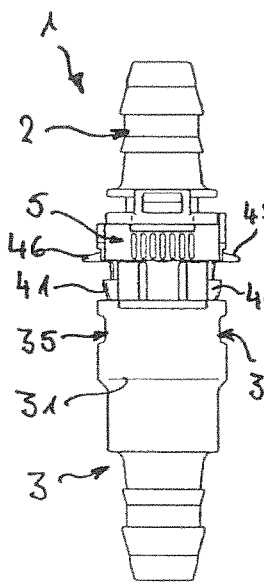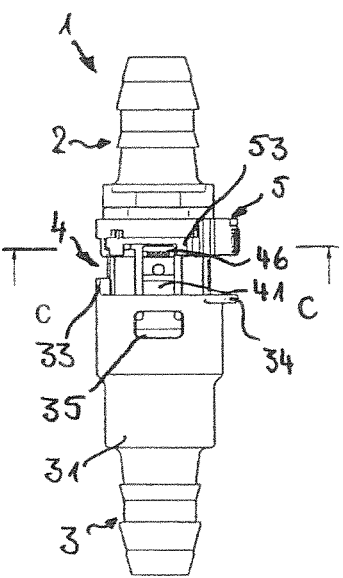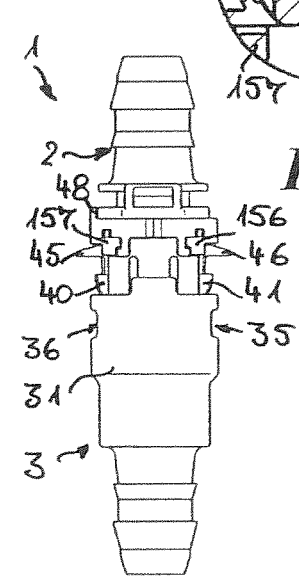
*Fig.6a*  *Fig.6b*  *Fig.6c*

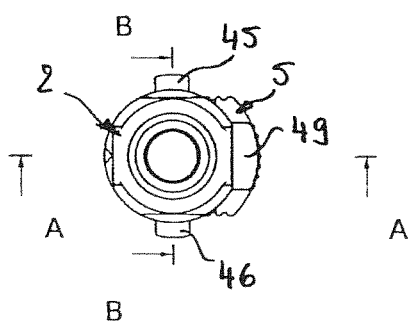
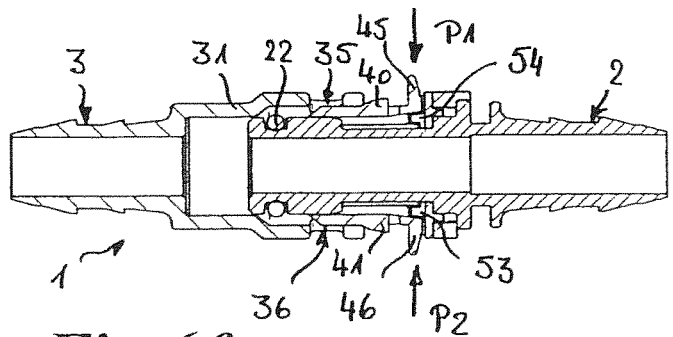
*Fig.6e*
*Fig.6f*
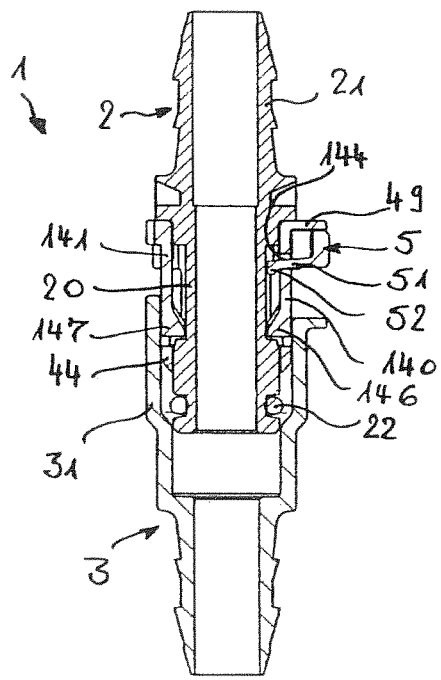
*Fig.6g*
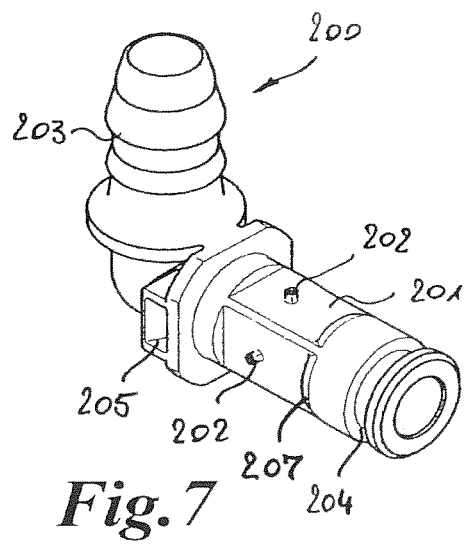
*Fig.7*
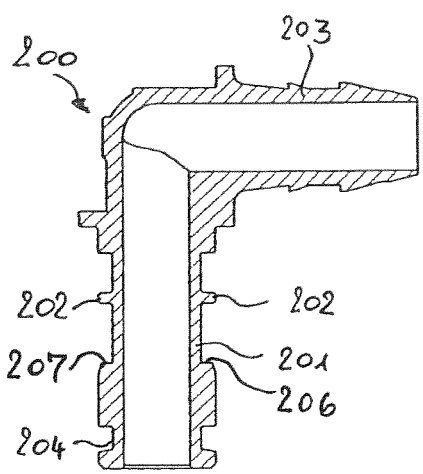
*Fig.7a*

CONNECTOR

FIELD OF THE INVENTION

The invention relates to a connector, in particular for hose lines and/or pipelines, comprising at least one socket part and at least one plug part, wherein the plug part can be or is inserted into a socket portion of the socket part and wherein at least one holding element is provided for releasably holding the plug part in the socket part and wherein the plug part can be or is provided with the holding element and the holding element is radially expandable in at least one portion and has at least one holding arm having at least one outwardly protruding latching lug on its outer surface, wherein the at least one holding arm has a free end and an end fixed to the holding element body and is resiliently movable in the radial direction relative to the plug part in order to latch the at least one latching lug on at least one latching surface or latching opening of the socket part and release it therefrom, and wherein at least one locking device is provided for securing the latching state of the plug part and the socket part and for indicating incorrect assembly thereof, wherein the at least one locking device cooperates with the at least one holding element.

BACKGROUND OF THE INVENTION

A very wide variety of connectors having a plug part and a socket part are known in the prior art. In order to secure the plug part in the socket part, it is likewise known to provide holding elements for this purpose. A very wide variety of forms of such holding elements are known. For example, according to EP 0 999 398 B1, a plug-in connector for hose lines and/or pipelines consists of a socket part and a plug part, the plug part being inserted with a plug shaft into a receiving opening of the socket part. The inserted plug part is sealed relative to the socket part by a peripheral seal and is locked against being pulled out by a locking device. Inside the socket part there is arranged a hollow-cylindrical plug-in pin which engages axially into the inserted plug shaft. The locking device consists of at least two diametrically opposite latching arms of the plug part which extend axially in the release direction approximately parallel to the plug axis and are resilient in the axial direction, wherein the latching arms in the inserted state each engage in an interlocking manner behind an undercut surface formed in the receiving opening of the socket part. The locking device is formed in one piece with the plug part.

From DE 86 04 217 U1 there is known a further plug-in connector for pressure-medium lines, in particular for connecting brake lines to a brake valve body, which plug-in connector consists of a housing and a plug, having a through-opening, which can be inserted with its plug shaft into a connecting bore of the housing. The plug is held in the axial direction against displacement by means of a holding element and is sealed by means of a peripheral seal arranged between the plug shaft and the housing. The plug is fixed against rotation relative to the housing by an interlocking connection. The interlocking connection consists of two latching elements arranged on the periphery of the plug shaft and non-rotatably connected thereto, which latching elements, in the inserted state of the plug, latch into openings in the housing, the latching elements consist of latching tongues. A safety cap is further pushed over the insertion opening and covers it with its cap bottom. With its outer wall it encloses the housing. The holding element consists of a bayonet catch, which is formed by a locking sleeve arranged on the plug shaft and the housing. Only a radial release movement is prevented with a construction of the plug-in connector. EP 2 224 156 A2 discloses a plug-in connector for media lines which comprises a plug part which can be inserted with a plug shaft in a sealing manner into a receiving opening of a connector counter-part and can be releasably locked relative thereto in a latching manner against being pulled out. The latching means consist of at least two latching arms of the plug part, which extend in the release direction approximately parallel to the insertion axis and are resilient in the radial direction. In the inserted state, the latching arms each engage in an interlocking or friction-based manner behind a latching step inside the receiving opening of the connector counter-part. The plug part is in the form of an integral, monolithic shaped part with the latching arms. A locking element is movably connected to the plug part in such a manner that, in a securing position, it blocks the latching means against release and, in a release position, it frees the latching means for a release movement which removes the blocking. The latching means are further so configured that different forces are to be overcome in the insertion and release directions. Disassembly is carried out by engaging end portions of the latching arms which protrude from the connector counter-part and are arranged adjacent to the plug part.

EP 1 106 896 B1 discloses a further plug-in connector for pressure-medium lines, which consists of a housing part and a plug part. The plug part is inserted with its plug shaft in a sealing manner into a receiving opening of the housing part and releasably blocked by means of a separate holding element having holding means which are resiliently movable in the radial direction. This is effected in that the holding element, in a blocking position, is seated with the holding means between an inner annular step in the receiving opening and an outer annular step of the plug shaft, wherein the holding element is so seated on the plug shaft, in order to be displaceable in the axial direction between a securing position and a freeing position, that the holding means in the securing position are blocked against a radial release movement and in the freeing position are freed for a radial release movement. A spring element is so arranged between the plug part and the holding element that the holding element can be brought automatically into the securing position by spring force and into the release position against the spring force. Assembly and disassembly take place axially by an axial lifting movement by engaging the holding element by means of a release or lifting tool. Apart from the holding element, the provision of the spring element is necessary to permit the desired blocking.

A further form of a plug-in connector for an overflow oil line is known from FR 2 930 621 A1. For latching there are provided in this solution on the one hand an annular holding element which partly surrounds the plug part, and on the other hand a tongue-shaped latching element which engages into a gap in the annular holding element in order that locking means are in their locking position and deformation of the annular holding element out of its blocking position into its release position is prevented.

DE 39 24 173 A1 further discloses a connection fitting consisting of a connection element which has a receiving bore for a pipe end provided with a fastening bead, and a sealing ring which encompasses the pipe end. For fastening in the connection element, there is fitted to the pipe end a bush which can be inserted into the receiving bore and which has a region which is resiliently deformable in the radial direction. This is provided in its bore with a groove which can be latched over the fastening bead and forms a latching catch engaging into a groove in the connection element. The pipe end is connected to the connection element by a simple insertion operation and is released again by opening the latching catch.

From U.S. Pat. No. 6,688,654 B2 there is known a one-piece connector having a tubular element and a collar. A pair of diametrically opposite actuating arms hangs from the collar and lies in a first plane. A pair of diametrically opposite locking arms likewise hangs from the collar and lies in a second plane, which is perpendicular to the first plane. The locking arms serve to interlock with an edge at the end of a line. They can be moved between a locking position and an unlocking position, depending on the movement of the actuating arms.

From WO 2015/058857 A2 there is further known a connector comprising a socket part and a plug part, wherein the plug part is inserted into a receiving opening of the socket part and wherein a holding element is provided for releasably latching the plug part in the socket part. The holding element and the plug part are in two-part form, and the holding element is radially expandable and mounted in a captive and rotationally fixed manner on the receiving portion of the plug part. The holding element has at least one holding arm having a protruding holding lug on its outer surface, wherein the holding arm extends approximately parallel to the insertion axis of the plug part and can be moved resiliently in the radial direction relative to the plug part in order to latch the holding lug with a latching surface of the socket part or unlock it. For the guided engagement of a release tool with the holding element in order to release the connection between the plug part with the holding element and the socket part, guide surfaces or guide portions are provided on the holding element body adjacent to the free end of the at least one holding arm.

SUMMARY OF THE INVENTION

The object underlying the present invention is to further develop a connector in such a manner that the latching state of the socket part and the plug part can be secured and incorrect assembly of the socket part and the plug part can quickly be recognized in order to make such a connector even more reliable in particular when pressurized medium is being passed through the connector.

The object is achieved by a connector according to the claims in that at least one locking device is a radially insertable locking element which cooperates with the holding element in the region of the at least one holding arm thereof. Further developments of the invention are defined in the dependent claims.

There is accordingly provided a connector which comprises at least one socket part and at least one plug part which can be inserted into one another, wherein the plug part is inserted into a socket portion, having a receiving opening, of the socket part. In addition to the at least one holding element for releasably holding the plug part in the socket part, at least one locking device is provided for locking the inserted position of the plug part and the socket part. The at least one holding element is either integral with the plug part or connected thereto, in particular by pushing on. It is advantageously mounted in a captive manner on a receiving portion of the plug part. The holding element can be radially expanded in at least one portion and has at least one holding arm having at least one protruding latching lug on its outer surface, wherein the at least one holding arm has a free end and an end fixed to the holding element body, that is to say the body of the holding element, and can be moved resiliently in the radial direction relative to the plug part. It is thereby possible to latch the at least one latching lug, which is arranged on the holding arm, on a latching surface or latching opening of the socket part or to release it from the latching position again. In order to secure the latching of the plug part and the socket part, the at least one locking device is provided, by means of which incorrect assembly of the plug part and the socket part can also be indicated. The at least one locking device is pushed radially onto the holding element and thereby cooperates with the holding element in the region of the holding arm(s) thereof so that, when the locking device is actuated, the plug part and the socket part cannot be assembled completely, that is to say the plug part and the socket part cannot be fully inserted into one another. Furthermore, the locking device cooperates with the holding element on the plug part in such a manner that the locking device can be released and brought into a position securing the plug connection between the plug part and the socket part only when the plug part is fully inserted into the socket part. Accordingly, it is possible to visually recognize, but also haptically identify by touch, whether a correct and complete plug connection and end position, that is to say complete assembly, of the plug part and the socket part is present or not. If, for example, the locking device protrudes above the surface of the connector in an unintended manner, it can be determined visually and haptically that incorrect assembly or incomplete assembly of the plug part and socket part must be present. Furthermore, if the plug part and the socket part cannot be fully inserted into one another because the locking device has been brought into its position which under normal conditions secures and blocks the complete assembly of the plug part and the socket part, it can likewise readily be determined that complete assembly of the plug part and the socket part is not present and there is accordingly a risk that, if pressurized medium is passed through the connector while the plug part and the socket part are in that position, the plug part and the socket part will separate. It is precisely in the case of pressurized media sent through hose lines or pipelines provided with the connector that there is a risk from the pressurized medium, which may then abruptly separate the incomplete connection between the plug part and the socket part and escape from the separated connector. In order to be able to reliably avoid this, incorrect assembly of the plug part and the socket part, or complete and incomplete assembly of the plug part and the socket part, can be determined visually and haptically by the locking device. In addition, for example, the at least one second locking device can be colored or have a colored marking, optionally all parts of the connector can be of different colors or marked with different colors, so that a visual check of a correct insertion position of the plug part and the socket part and of the locking device by a visual check of the at least one locking device, that is to say the positioning thereof on the connector, is possible.

By providing the at least one locking device in the form of a radially insertable locking element, in particular similar to a holding clamp, a visual and haptic check, for example, of a correct assembly state of the connector, that is to say of a correct and complete insertion state of the plug part and the socket part in one another, is possible by visually and/or haptically checking the position of the radially insertable locking element. In particular, an incomplete insertion state or incorrect assembly of the plug part and the socket part can be recognized in that the radially insertable locking element protrudes far above the surface of the socket part and the plug part and does not engage in a holding manner with the holding element. By cooperating with the at least one holding arm of the holding element, it is possible for the radially insertable locking element to block the holding element as long as an incomplete or incorrect insertion state, that is to say incorrect assembly of the plug part and the socket part, is present. On the other hand, the holding arm of the holding element can prevent the radially insertable locking element from being inserted into its fully inserted position as long as the holding arm is not in the latching position of its at least one latching lug on the latching surface or latching opening of the socket part. Particularly advantageously, therefore, the radially insertable locking element, when seen from above, is U-shaped with two legs and a transverse portion arranged therebetween, wherein at least one portion, or blocking portion, of the legs or on the legs serves for engagement between the free end of the at least one holding arm and the plug part. Between the free end of the holding arm and the outside of the plug part, a space is thus advantageously provided, in the fully latched state of the holding element and the latching groove or opening or surface in the socket part, whereby the legs of the radially insertable locking element or of the locking device in the form of such a radially insertable locking element engage into that space, or gap, and are accordingly able to engage the holding element or the holding arms thereof. The legs of the radially insertable locking elements advantageously have blocking portions for engaging behind the holding arms of the holding element in a blocking manner.

The provision of the at least one locking device accordingly serves to securely lock the plug part and the socket part of the connector to one another and also to indicate incorrect assembly of the plug part and the socket part. The locking device, or the radially insertable locking element, is accordingly movable radially relative to the holding element, or the plug part, and socket part, and can be or is preassembled on the holding element, and can be displaced from a preassembled position into a locking position. By means of the locking device it is possible to detect a correct insertion position of the plug part and the socket part with one another in two respects, since complete radial insertion of the locking device in the form of a radially insertable locking element is possible only when the plug part and the socket part are fully inserted and are thus fully assembled with one another and in the desired end position. A transport lock position of the locking device is advantageously provided, wherein at least one blocking portion, or at least one blocking element, prevents the locking device from being able to be brought or pushed radially into its end position if the plug part and the socket part are not inserted fully, that is to say if the plug connection is not inserted fully and securely.

If the radially insertable locking element is brought into its end position improperly and with the application of force, without the plug part and the socket part being in the fully inserted state, it is no longer possible for the socket part to be fitted to the plug part in this position since this is prevented by the radially insertable locking element inserted between the holding arms and the plug part, because the holding arms are blocked and the latching lug is thus prevented from engaging behind the holding arm and the latching surface or latching opening on the socket part. Accordingly, when the radially insertable locking element is fully inserted, the holding arm or holding arms of the holding element is/are blocked, so that they are no longer movable in the radial direction relative to the plug part and latching of the at least one latching lug on at least one latching surface or latching opening of the socket part is thereby prevented.

The transverse portion arranged between the legs of the radially insertable locking element is advantageously provided with at least one protruding blocking element which can be engaged or engages into at least one opening in the holding element. Particularly advantageously, the blocking element is tongue-like and has an end that is fastened to the transverse portion or fixed and a free end, wherein the free end is provided at the end with at least one protruding lug-shaped latching portion. The protruding lug-shaped latching portion serves on the one hand to engage into an opening in the holding element and for securing the blocking element in the opening against automatically moving out, such as sliding out or slipping out, or release from that opening, and on the other hand to prevent engagement by abutment of the lug-shaped latching portion on the outside of the holding element. Without application of a pressure to the blocking element transversely to the blocking element, the lug-shaped latching portion prevents the radially insertable element from being inserted radially into its fully inserted position. Furthermore, an anti-loss means holds the radially insertable locking element in a captive position so that the radially insertable locking element, once fitted onto the holding element, is fixed in a captive and radially displaceable manner on the holding element. The pressure for deflecting the blocking element in order to bring it into an aligned position above the opening can be exerted on the blocking element by the socket part. When the radially insertable locking element is brought into the fully inserted position in which the holding arms of the holding element are thus held and locked against unintentional release of the plug part from the socket part, the blocking element engages into the opening in the holding element and is secured therein by latching with the lug-shaped latching portion. Accordingly, the locking element, which is fitted to the plug part, advantageously has, in the region between the at least two mutually opposite holding arms, the corresponding opening into which the blocking element, in particular the tongue-like blocking element, can engage and be secured therein by the protruding lug-shaped latching portion. Dual detection of the insertion position of the plug part by the holding arms and the blocking element of the locking device, or of the radially insertable locking element, is thus possible, wherein one detection relates to the position of the edge of the socket part and a further detection relates to the fully (radially) outwardly deflected position of the holding arms. When the plug part is inserted sufficiently deeply into the socket part, the socket part is able to engage the blocking element with, for example, an edge or a protruding or projecting portion and deflect it, so that the blocking element is located above the opening and the radially insertable locking element can be brought into its fully inserted position when a pressure directed radially relative to the holding element is exerted on the radially insertable locking element. In that position, the holding arms are prevented from being actuated in the radial (release) direction which, in the case of a fully inserted connection/connector, has the effect that the holding arms cannot be brought into the release position and, when the socket part is absent, has the effect that the socket part can no longer be fitted to the plug part. When the radially insertable locking element is in the fully inserted position on the holding element, the latching portion arranged at the end of the blocking element is located in the opening in the holding element and is secured in the opening or at the edge thereof. The locking device can thus advantageously be brought or inserted fully into its end position only when the blocking element projects into the opening of the holding element, or the lug-shaped latching portion of the blocking element is located in that opening, and the holding arms of the holding element are radially movable.

The blocking element and the edge or the radially projecting portion of the socket part are thus able to cooperate in such a manner that the blocking element is released by the edge or the radially projecting portion of the socket part and is guided into the opening of the holding element. Accordingly, when the socket part is pushed axially onto the plug part, such an edge or such a radially projecting portion in particular at the edge of the socket part presses against the tongue-like blocking element, so that its lug-shaped latching portion arranged at the end is deflected and thereby brought above the opening in the holding element. In this position, the radially insertable locking element can be pushed radially into the fully inserted position, in which the plug part and the socket part are thus locked together. The lug-shaped latching portion thus serves to prevent the locking device from being displaced radially into a locking position in which the blocking element engages into the opening in the holding element, and to prevent the blocking element from being pulled back out of that opening.

Furthermore, the positioning of the radially insertable locking element, that is to say its actual insertion position, or a release position and a blocking position of the locking device in the form of the radially insertable locking element can be ascertained by means of the blocking element. Engagement of the blocking element, or of its protruding lug-shaped latching portion at the end of the tongue-like blocking element, into the at least one opening in the holding element is possible, when the plug part and the socket part are inserted one into the other, only when the plug part and the socket part are fully in the correct insertion position. Thus, when the plug part and the socket part are fully inserted correctly, full insertion of the radially insertable locking element is enabled and, when the plug part and the socket part are incorrectly assembled or not inserted fully, it is correspondingly blocked. At the same time, the second locking device in particular in the form of the radially insertable locking element serves the purpose of secondary locking. Accordingly, accidental release of the holding element from the latching position in the socket part is thereby reliably prevented, because the fully inserted radially insertable locking element as the locking device prevents the holding element from being unlocked or released from its latching position on the socket part, since it engages the holding arms which optionally effect such a release and pushes or holds them into/in the latching position. The legs of the radially insertable locking element therefore advantageously have such a shape and are at such a distance from one another that, when they are fully fitted onto the holding element, they engage two mutually opposite holding arms and block them against a radial release movement in the direction towards the plug axis. Because the holding arms are prevented by the corresponding portion of the legs of the radially insertable locking element from springing freely and instead are held spaced apart radially from the plug part by the corresponding blocking portion of the legs of the radially insertable locking element, latching of the at least one latching lug of the at least one holding arm of the holding element on the at least one latching surface or latching opening of the socket part is no longer possible because the latching lug protrudes too far radially to come into engagement with the latching surface or latching opening on the socket part. Thus, if the radially insertable locking element is fitted completely, that is to say in the end position, onto the plug part, or the holding element thereof, by improper treatment and by overcoming the blocking function by the transport lock by means of the tongue-like blocking element having a lug-shaped latching portion, before the socket part has been fitted completely onto the plug part, such complete fitting of the socket part onto the plug part is no longer possible on account of the latching lugs, which project too far radially, on the holding arms of the holding element of the plug part. Conversely, in the case of an incomplete insertion operation of the plug part and the socket part, complete insertion of the radially insertable locking element is not possible because the legs, or the corresponding blocking portion of the of the legs, of the radially insertable locking element cannot engage into the region between the free ends of the holding arms and the plug part because, in the case of an incomplete insertion operation, the holding arms are pressed too far radially in the direction towards the plug part by the socket part to allow the legs of the radially insertable locking element to engage therebetween. An additional safeguard is thus provided. Accordingly, in the case of an incomplete insertion operation of the plug part and the socket part, the radially insertable locking element protrudes at least so far above the outer periphery of the plug part that it is detectable visually and haptically. Only when the holding arms of the holding element are free, that is to say their latching lugs engage beneath the corresponding latching surfaces or latching surface of the socket part or engage into corresponding latching openings in the socket part and latch therein, is it possible to push the legs of the radially insertable locking element with the corresponding blocking portion between the holding arms and the plug part and thereby bring them into the position blocking the holding arms.

The plug part can on the one hand be in the form of a monolithic plug part, wherein the holding arms are arranged directly on the body of the plug part, in particular are formed in one piece therewith. It is further possible to form a separate holding element and to fit or push it axially onto a receiving portion of the plug part. The plug part and the holding element are then multi-part. However, it has been found to be advantageous to provide an anti-loss means in order to prevent the unintentional release of the holding element from the plug part.

The holding element advantageously has holding arms having latching lugs which are directed inwards and outwards relative to the holding element. A combination of outwardly and inwardly directed latching lugs on the holding element and acting therewith not only serves as an anti-loss means but especially serves to latch the holding element on the plug part. The inwardly directed latching lugs thereby absorb the same forces as the outwardly directed latching lugs.

It is further found to be advantageous, in the case of a two-part configuration of the plug part and the holding element, to provide at least one of the two parts with an anti-rotation means in order to prevent the plug part and the holding element from unintentionally rotating relative to one another on assembly and during operation. In particular, the plug part can be in polygonal form on the outside in at least one portion in order to provide such an anti-rotation means. It is further possible that the socket part also has at least one anti-rotation means in order to allow the socket part to be fitted to the plug part in the desired orientation and positioning relative thereto. In particular, the socket part can have at least one protruding element and/or at least one surface and/or shaping that secures against rotation. Particularly advantageously, the plug part and/or the holding element which is fitted thereto or formed in one piece therewith has a corresponding counter-surface so that the surfaces of the socket part and the plug part, or the holding element thereon, that are in contact prevent the plug part and the socket part from rotating. This can also be provided by a complementary element, or a groove, cut-out or recess on the plug part or on the holding element, on the plug part or at the plug part, which interlocks with the at least one protruding element on the socket part and accordingly forms an anti-rotation means and/or positioning aid for the socket part relative to the plug part. Furthermore, the socket part can also have a groove, cut-out or recess or a corresponding undercut surface into which a correspondingly protruding element on the plug part or holding element engages in order thereby to form an anti-rotation means and/or positioning aid.

It is further found to be advantageous if the plug part, in particular the receiving part on the plug part for receiving the holding element, is provided with at least one device for pressure locking which cooperates with the holding element and prevents the holding element from being unlocked when there is pressure inside the connector. When a pressure lock is provided, it is sufficient to provide the connector having the at least one plug part and the at least one socket part, wherein the plug part can be inserted into the socket portion of the socket part, wherein the at least one holding element is provided for releasably holding the plug part in the socket part and wherein the plug part can be or is provided with the holding element. Particularly preferably, the pressure locking device comprises at least one element that protrudes from the outside of the receiving portion of the plug part, in particular at least one protruding pin or at least one protruding elevation. The holding element advantageously comprises at least one opening. This at least one opening is advantageously arranged in (at least) one of the holding arms of the holding element. Specifically, when there is pressure inside the connector, for example due to the flow of pressurized medium through the connector, it is important that the plug part and the socket part are securely fixed to one another. When the plug part and the holding element are in the form of two parts which are fitted together, it is accordingly found to be advantageous to lock and secure the holding element via the pressure locking device, in particular one or more projecting elements on the receiving portion of the plug part, when there is media pressure inside the connector. A relative axial movement between the holding element and the plug part is brought about by applying pressure to the plug part. The plug part thereby moves axially in the counter-insertion direction, that is to say contrary to the insertion direction, while the holding element is fixed in an axially non-displaceable manner in the socket part. For pressure locking, the protruding element, as a result of displacement of the holding element relative to the plug part in the axial direction of the holding element, is advantageously located outside an opening in the holding element. A radial movement of the holding arm or holding arms is thereby blocked. Accordingly, the axial play of the holding element on the receiving portion of the plug part is advantageously such that the holding element is at least at a sufficient distance from the opening into which the at least one protruding element dips that the holding arms are not in a release position when the at least one protruding element is outside the opening. As a result of the axial displacement between the plug part and the holding element, the protruding elements are displaced out of the region of the opening(s) and thus block the holding arms radially.

The receiving portion can further have edges and/or be in polygonal form and/or have projecting elements, such as rods, extending in the longitudinal direction of the plug part, which elements on the one hand interlock with correspondingly complementary surfaces or portions of the holding element and on the other hand effect an anti-rotation means for preventing the holding element from rotating on the receiving portion of the plug part.

It is further found to be advantageous if the socket part consists of at least one plastics material and is provided with the at least one latching opening on the lateral surface. Alternatively, the socket part can be in the form of a machined part, in particular consist of at least one metal, and be provided with at least one undercut surface as the latching surface for latching of the at least one latching lug of the holding arm of the holding element. Accordingly, the socket part, when formed from at least one plastics material, advantageously has a latching opening on the lateral surface in order that the at least one latching lug of the at least one holding arm of the holding element, which has been or is arranged on the plug part, is able to engage therein. Alternatively, the socket part can be formed as a machined part of at least one metal. In this case, it advantageously has a latching surface, which is in particular an undercut surface, in order that the at least one latching lug of the at least one holding arm of the holding element, which is arranged on the plug part, can engage thereon. The plug part can accordingly be combined both with a socket part of a plastics material and with a socket part of at least one metal. The plug part can also consist of at least one plastics material or at least one metal. In particular, the socket part can further be in the form of a straight plug part or right-angle plug part or have any shape, including a bent shape.

When a polygonal form, in particular a tetragonal form, of the receiving portion of the plug part, on which the holding element is received or seated, is provided, the position of the holding element with the locking device fitted thereto can be varied in 90° steps on the plug part or around the periphery thereof, in order to allow the locking device to be actuated from different actuation directions. This is found to be advantageous in particular when the connector has been or is arranged in an inaccessible manner, for example in a vehicle, in particular in a very confined space. The possibility of arranging the locking device in different positions on the holding element or the plug part provides great flexibility in connection with the possibility of additional blocking of the holding arms of the holding element. The arrangement of the locking element provides greater resistance to lateral loading forces which act on the connector, as well as against forces acting on the connection between the plug part and the socket part in the removal direction. Such removal forces act in the release direction for releasing the connection between the plug part and the socket part, that is to say contrary to the insertion direction thereof. Forces in the removal direction can occur as a result of the action of forces on the hose lines or pipelines with which the plug part and the socket part are connected, which forces act on the plug part and the socket part, or on the connector, specifically in the removal direction with respect to the connection between the plug part and the socket part. Lateral loading forces can occur during operation, for example, in a vehicle during operation thereof, in particular during journeys on uneven ground. Furthermore, adjacent components, such as, for example, other lines or cable harnesses, can act on the connector and exert removal forces. However, owing to the locking device in particular in the form of the radially insertable locking element, the connection of the plug part and the socket part to one another is additionally secured, so that particular protection can thereby be provided also against removal forces and forces acting laterally on the connector.

BRIEF DESCRIPTION OF THE DRAWINGS

In order to explain the invention in greater detail, exemplary embodiments thereof will be described hereinbelow with reference to the drawings, in which:

FIG. 1 is a perspective view of a connector according to the invention having a plug part and a socket part in the delivery state with the plug part not yet inserted into the socket part, wherein the plug part is provided with a holding element according to the invention and a locking device according to the invention, FIG. 1a is a side view of the connector according to FIG. 1, FIG. 1b is a side view, rotated through 90° relative to the view in FIG. 1a, of the connector according to FIG. 1, FIG. 1c is a side view, rotated through 180° relative to the view in FIG. 1a and slightly enlarged, of the connector according to FIG. 1, FIG. 2a is a side view of the connector according to FIG. 2, FIG. 2b is a side view, rotated through 90° relative to the view in FIG. 2a, of the connector according to FIG. 2, FIG. 2c is a side view, rotated through 180° relative to the view in FIG. 2a, of the connector according to FIG. 2, FIG. 2d is a cross-sectional view of the connector according to FIG. 2b along line C-C, FIG. 2e is a front view of the plug part of the connector according to FIG. 2, FIG. 2g is a longitudinal sectional view through the connector according to FIG. 2 along line A-A from FIG. 2e, FIG. 3 is a perspective view of the connector according to FIG. 1 in the fully inserted position of the plug part and the socket part in which the holding arms of the holding element on the plug part are free and the locking device is not blocking, that is to say is free, FIG. 3a is a side view of the connector according to FIG. 3, FIG. 3b is a side view, rotated through 90° relative to the view in FIG. 3a, of the connector according to FIG. 3, FIG. 3c is a side view, rotated through 180° relative to the view in FIG. 3a, of the connector according to FIG. 3, FIG. 3d is a cross-sectional view through the connector according to FIG. 3 along line C-C shown in FIG. 3b, FIG. 3e is a front view of the plug part of the connector according to FIG. 3, FIG. 3f is a longitudinal sectional view of the connector according to FIG. 3, shown along line B-B from FIG. 3e, FIG. 3g is a longitudinal sectional view of the connector according to FIG. 3, cut along line A-A from FIG. 3e, FIG. 4 is a perspective view of the connector according to FIG. 1 in a fully inserted position in respect of the plug part and the socket part, in which the locking device is likewise blocking and is in its end position, FIG. 4a is a side view of the connector according to FIG. 4, FIG. 4b is a side view, rotated through 90° relative to the view in FIG. 4a, of the connector according to FIG. 4, FIG. 4c is a view, rotated through 180° relative to the view shown in FIG. 4a, of the connector according to FIG. 4, FIG. 4d is a cross-sectional view of the connector along line C-C from FIG. 4b, FIG. 4e is a front view of the plug part of the connector according to FIG. 4, FIG. 4f is a longitudinal sectional view through the connector according to FIG. 4 along line B-B from FIG. 4e, FIG. 4g is a longitudinal sectional view through the connector according to FIG. 4 along line A-A from FIG. 4e, FIG. 5 is a perspective view of a second embodiment of a connector according to the invention having a plug part and a socket part, wherein the socket part is in the form of a machined part, in a fully inserted position of the plug part and the socket part with the locking device likewise in the blocking or locking end position, FIG. 5a is a side view of the connector according to FIG. 5, FIG. 5b is a side view rotated through 90° relative to the view shown in FIG. 5a, FIG. 5c is a side view, rotated through 180° relative to that in FIG. 5a, of the connector according to FIG. 5, FIG. 5d is a cross-sectional view through the connector according to FIG. 5, cut along line C-C from FIG. 5b, FIG. 5e is a front view of the plug part of the connector according to FIG. 5, FIG. 5f is a longitudinal sectional view of the connector according to FIG. 5, cut along line B-B from FIG. 5e, FIG. 5g is a longitudinal sectional view of the connector according to FIG. 5, cut along line A-A according to FIG. 5e, FIG. 6 is a perspective view of the connector according to FIG. 1 but, in contrast to that connector, the locking device is inserted in its end position and the socket part is not fitted, FIG. 6a is a side view of the connector according to FIG. 6, FIG. 6b is a side view, rotated through 90° relative to the view in FIG. 6a, of the connector according to FIG. 6, FIG. 6c is a side view, rotated through 180° relative to that of FIG. 6a, of the connector according to FIG. 6, FIG. 6d is a slightly enlarged cross-sectional view of the connector according to FIG. 6, cut along line C-C from FIG. 6b, FIG. 6e is a front view of the plug part of the connector according to FIG. 6.

FIG. 6f is a longitudinal sectional view of the connector according to FIG. 6, cut along line B-B from FIG. 6e, FIG. 6g is a longitudinal sectional view of the connector according to FIG. 6, cut along line A-A from FIG. 6e, FIG. 7 is a perspective view of a right-angle plug part according to the invention which is provided in its receiving portion for receiving a holding element with protruding elements on the outer surface for forming a pressure locking device in combination with a holding element fitted thereto, FIG. 7a is a longitudinal sectional view of the right-angle plug part according to FIG. 7.

DETAILED DESCRIPTION OF THE INVENTION

Figure 1D:
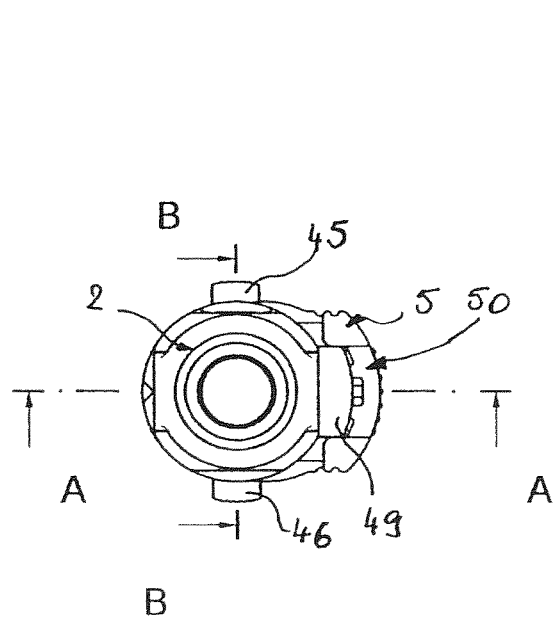
FIG. 1d is a front view of the plug part of the connector according to FIG. 1 from the direction of its mandrel portion.
Figure 1E:
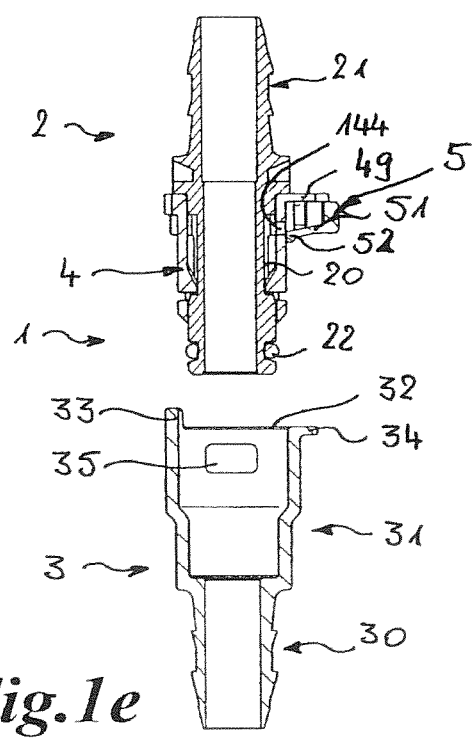
FIG. 1e is a longitudinal sectional view of the connector according to FIG. 1 along line A-A from FIG. 1d.
Figure 1F:
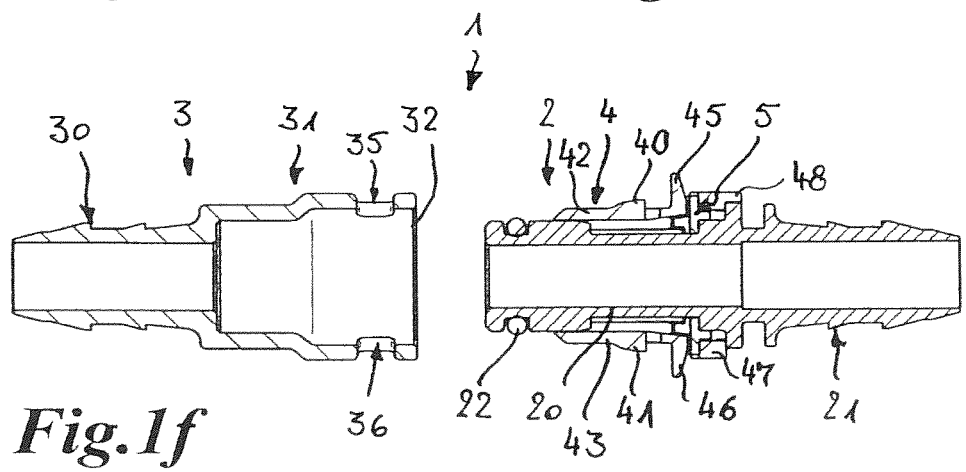
FIG. 1f is a longitudinal sectional view of the connector according to FIG. 1 along line B-B from FIG. 1d.

FIGS. 1a to 1f show a connector 1 which comprises a plug part 2, a socket part 3, a holding element 4, which is fitted to the plug part 2, and a locking device in the form of a radially insertable locking element 5. The connector 1 is shown in FIGS. 1 to 1f in the so-called delivery state, that is to say in the preassembly state. The plug part 2 and the socket part 3 have not yet been inserted into one another, but the holding element 4 has been pushed onto a receiving portion 20 of the plug part 2. This can be seen particularly clearly in FIGS. 1e and 1f, but also in FIGS. 1 to 1c. The radially insertable locking element 5 is in a preassembly position in which it has been radially fitted to the plug part 2 but is in the preassembly inserted state in which the holding element 4 is not blocked but is released. Apart from the receiving portion 20, the plug part 2 comprises a mandrel portion 21 via which a connection can be made in particular with a pipeline or hose line, which is not shown in FIG. 1. Such a pipeline or hose line is pushed at its end onto the mandrel portion 21, that is to say is fitted thereto by expansion. The socket part 3 also has a corresponding mandrel portion 30, in order to allow in particular a pipeline or hose line also to be fixed thereto by expansion.

The socket part 3 further has a socket portion 31 which receives the plug part 2 and is provided at the end with a portion 33 arranged in the axial direction of the socket part 3 and protruding above the upper edge 32 of the socket portion 31 of the socket part 3, and with a portion 34 projecting radially from the upper edge 32 of the socket portion 31 approximately opposite the axially protruding portion 33. Offset by approximately 90° to the two portions 33, 34, the socket portion 31 of the socket part 3 has two mutually opposite window openings 35, 36 which serve as latching openings for latching lugs 40, 41 on the holding element 4. The latching lugs 40, 41 are arranged facing outwards on holding arms 42, 43 of the holding element 4, as can be seen not only in FIGS. 1, 1a, 1b, 1c and 1f but particularly clearly also in FIGS. 13a to 13l, in which the holding element 4 is shown in detail. The holding element 4, or the holding element body 44, has at its two mutually opposite ends a terminal continuous circumferential edge, namely at one end a continuous edge 148 and at the opposite other end of the holding element 4 or holding element body 44 a bead-like protruding terminal edge 47. The holding arms 42, 43 and 140, 141 are fixed alternately to one edge 148 and to the other edge 47, that is to say the holding arm 42 is fixed to the edge 148, the holding arm 140 is fixed to the edge 47, the holding arm 43 is fixed to the edge 148 and the holding arm 141 is fixed to the edge 47. Apart from the end 242, 243 fixed to the edge 148 or to the holding element body 44, the holding arms 42, 43 each have an opposite free end 142, 143 which is resiliently movable in the radial direction (relative to the holding element 4 or holding element body 44). The latching lugs 40, 41 are arranged on the two holding arms 42, 43 not at the end but along the longitudinal extent thereof, in particular approximately in the middle region between the free end 142 or 143 and the fixed end 242, 243 of the holding arms 42, 43. Apart from the end 244, 245 fixed to the edge 148, the holding arms 140, 141 each likewise have an opposite free end 240, 241 which is resiliently movable in the radial direction (relative to the holding element 4 or holding element body 44).

An actuating element 45, 46 projects approximately radially outwards, that is to say away from the holding element body 44 of the holding element 4, at the end of each of the free ends 142, 143 of the holding arms 42, 43. By application of a force directed radially inwards relative to the holding element 4, the latching lugs 40, 41 can be brought from a latching position into an unlatched position in order to release the plug part with the holding element fitted thereto from the socket part, that is to say to move the latching lugs 40, 41 out of the latching openings or window openings 35, 36 and allow the plug part 2 to be removed axially from the socket part 3 or, conversely, the socket part 3 to be removed axially from the plug part 2.

Figure 14A:
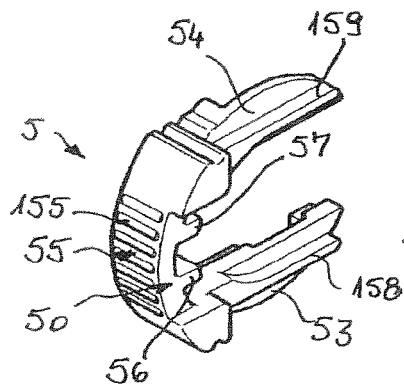
FIG. 14f is a top view of the radially insertable locking element according to FIGS. 14a to 14e.
FIG. 14g is a bottom view of the radially insertable locking element according to FIGS. 14a to 14e.
FIG. 14h is a longitudinal sectional view of the radially insertable locking element according to FIGS. 14a to 14e, cut along line D-D from FIG. 14g.
FIG. 14i is a further sectional view of the radially insertable locking element according to FIGS. 14a to 14e, cut along line E-E from FIG. 14g.
FIG. 14j is a first side view of the radially insertable locking element according to FIGS. 14a to 14e.
FIG. 14k is a side view, rotated through 90° relative to the side view shown in FIG. 14j, of the radially insertable locking element according to FIGS. 14a to 14e.
FIG. 14l is a side view, rotated through 180° relative to the side view shown in FIG. 14j, of the radially insertable locking element according to FIGS. 14a to 14e.
Figure 14B:
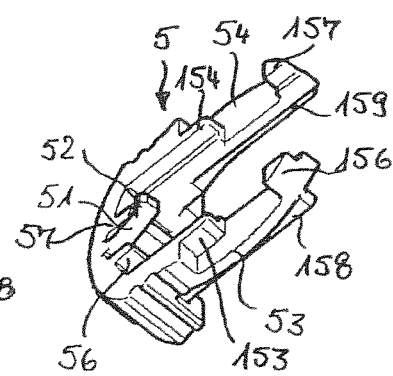
Figure 14C:
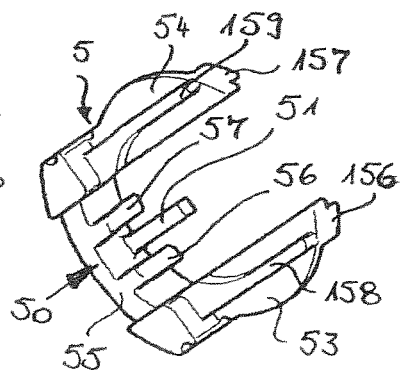
Figure 19:
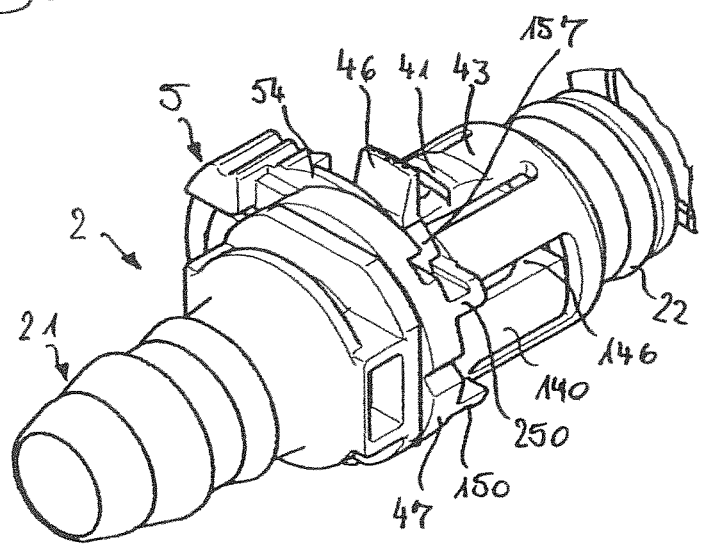

As can further be seen in particular in FIGS. 13a to 13l, the holding element 4 has the bead-like protruding terminal edge 47 adjacent to the respective actuating element 45, 46 but spaced apart therefrom. At the opposite end, the holding element 4 has the continuous edge 148. In the region of the actuating element 45, a portion 48 projects in the axial direction of the holding element 4 from the bead-like protruding terminal edge 47. Offset by approximately 90° thereto, that is to say between the two actuating elements 45, 46 or the corresponding holding arms 42, 43, that is to say at the location of the holding arm 140, adjacent to the fixed end 244 thereof, a radial portion 49 protrudes radially outwards from the bead-like protruding terminal edge 47. That radial portion serves for interlocking with the radially insertable locking element 5, which has a corresponding groove or cut-out 50 (see FIG. 15d) into which the radial portion 49 engages (see in particular FIG. 1d as well as FIGS. 14a and 14c). Adjacent to the radial portion 49, two axial webs 149, 249 are arranged on the holding element body 44. On the side of the holding element body 44 opposite the radial portion 49, two corresponding axial webs 150, 250 protrude axially from the bead-like protruding terminal edge 47, as can be seen particularly clearly in FIG. 1 as well as FIGS. 13a and 13b. The spacing of the two axial webs 150, 250 from one another is in particular such that the axially protruding portion 33 at the upper edge 32 of the socket portion 31 of the socket part 3 is able to engage into that spacing in order to provide a positioning aid and also an anti-rotation means for the socket part 3 relative to the plug part 2 provided with the holding element 4. In the region of the axial webs 149, 249 and 150, 250, the holding element body 44 is tongue-shaped and extends in the longitudinal direction or axial direction of the holding element body 44 as the holding arm 140 or 141 provided with the free end 240 or 241 already mentioned. The two holding arms 140, 141 and two holding arms 42, 43 with their outwardly facing latching lugs 40, 41 are distributed alternately over the periphery of the holding element 4. The two holding arms 140, 141 also each have a latching lug 146, 147, which latching lugs are, however, directed inwardly in the direction towards the receiving portion 20 of the plug part 2 (see in particular FIGS. 2g, 5g, 19). The latching lugs 146, 147 are arranged at the ends of the holding arms 140, 141, that is to say at the free ends 240, 241 of the two holding arms 140, 141. The holding arms 140, 141 are radially deflectable relative to the holding element 4 at their ends in the region of their free ends 240, 241 for latching on a latching surface or a latching shoulder or latching element of the plug part. By means of the latching lugs 146, 147, they are retained at a correspondingly shaped shoulder or element on the outside of the receiving portion 20 of the plug part 2, come into engagement therewith (see, for example, FIG. 3g). As can be seen in FIG. 3g, the latching lugs 146, 147 of the two holding arms 140, 141 engage into the corresponding grooves or flattened portions on the periphery of the receiving portion 20 of the plug part 2 and are supported therein and on the surface thereof in the removal direction of the socket part 3 from the plug part 2 at a respective shoulder 26, 27 of the plug part 2, which delimits the receiving portion 20, or at a respective shoulder 206, 207 of the plug part 200 (see also FIGS. 7, 7a, 8, 8a). However, a certain degree of axial maneuverability or movability of the holding element 4 relative to the plug part 2 or on the receiving portion 20 thereof continues to be maintained.

Figure 11:
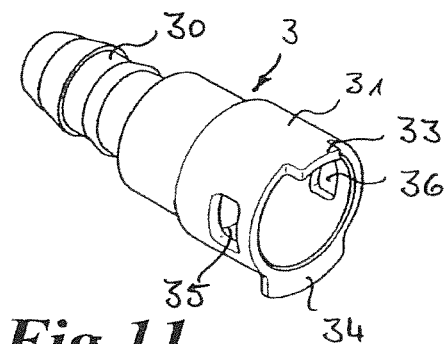
FIG. 11 is a perspective view of the socket part of the connector according to FIG. 1.
Figure 11A:
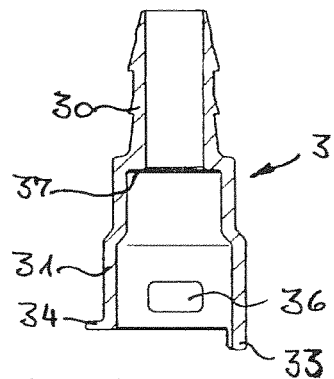
FIG. 11a is a longitudinal sectional view through the socket part according to FIG. 11.

The two holding arms 140, 141 with their inwardly facing latching lugs 146, 147 for retention on the plug part 2 or the receiving portion 20 thereof, and the two holding arms 42, 43 with their outwardly facing latching lugs 40, 41 for retention on the socket part 3 are accordingly arranged alternately over the periphery of the holding element 4, in each case offset by 90° relative to one another. The mutually opposite holding arms 140, 141 are thereby fixed to the edge 47 and the two mutually opposite holding arms 42, 43 are fixed to the edge 148. The free ends 240, 241 of the two holding arms 140, 141 extend almost as far as, and end at a distance from, the edge 148, arranged between the two fixed ends 242, 243 of the two adjacent holding arms 42, 43. The free ends 142, 143 of the two holding arms 42, 43 extend almost as far as, and end at a distance from, the edge 47, arranged between the two fixed ends 244, 245 of the two adjacent holding arms 140, 141, as can be seen in particular in FIGS. 11k and 11l.

Figure 14D:
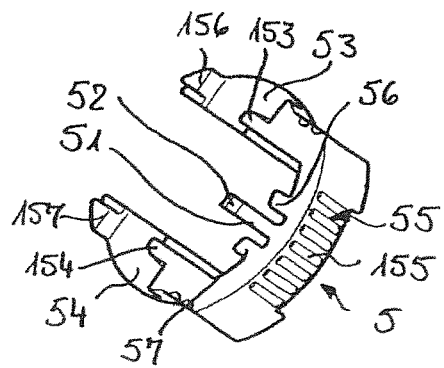
Figure 14E:
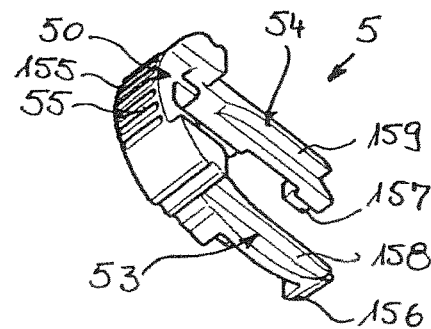
Figure 14F:
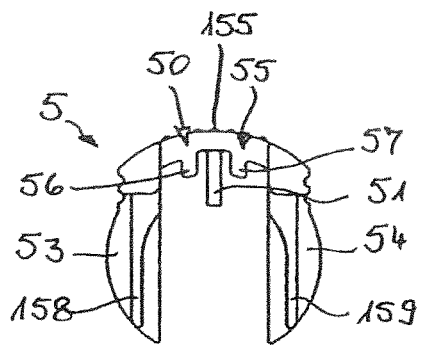
Figure 14G:
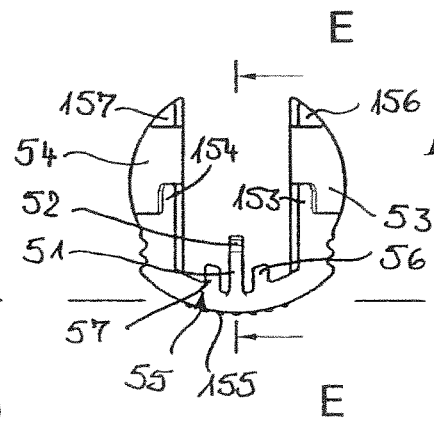
Figure 14H:
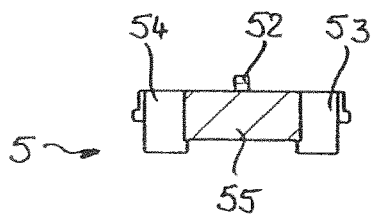
Figure 14I:
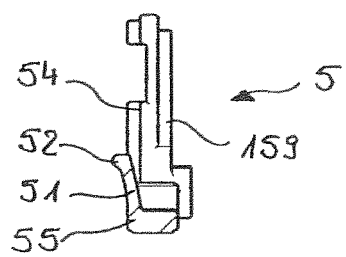
Figure 14J:
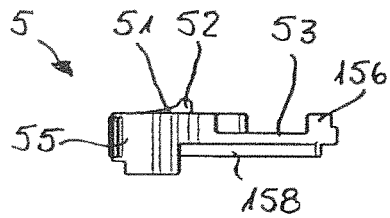
Figure 14K:
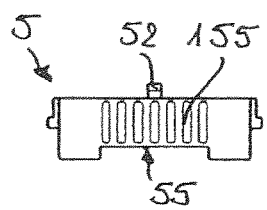
Figure 14L:
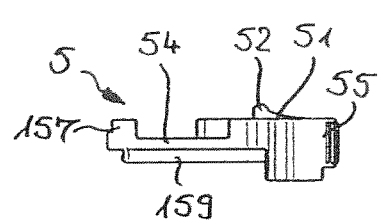

At least the holding arm 140 has in the region between the two axial webs 149, 249 a through-opening 144 which is in the form of a small window. The blocking element 51 of the radially insertable locking element 5 is able to engage into this through-opening 144 and latch onto the edge bordering the through-opening 144 or be supported in the preassembly position on the outside of the holding arm 140 next to the through-opening 144. For this purpose, the blocking element 51 has a latching lug 52 at the end. The position of the latching lug 52 bearing on the outside of the holding arm 140 next to the through-opening 144 forms a transport lock for preventing the radially insertable locking element 5 from being unintentionally pushed into a fully inserted position. In the position introduced into the through-opening 144, the latching lug 52 can be retained on the edge bordering the through-opening 144 and secure the blocking element 51 and thus the radially insertable locking element against being unintentionally released from the locking position. Furthermore, in that position the holding arms 42, 43 of the holding element 4 are prevented from moving radially in the direction towards the plug part, because the radially insertable locking element 5 engages behind the holding arms with blocking portions 153, 154. The blocking portions 153, 154 can be seen particularly clearly in FIGS. 14b, 14d and 14g. If the latching lug 52 is supported on the outside of the holding arm 140 next to the through-opening 144, the blocking portions 153, 154 of the radially insertable locking element 5 also do not engage behind the holding arms 42, 43 of the holding element 4 (see e.g. FIG. 2d). In this preassembly position of the radially insertable locking element 5, the holding arms 42, 43 are thus freely movable radially for latching interlocking with the corresponding latching opening 35, 36 of the socket part 3.

The tongue-like blocking element 51 with the latching lug 52 arranged at the end can be seen particularly clearly in FIGS. 14b, 14d, 14f to 14l. As can be seen in particular in FIGS. 14b and 14e, the blocking element 51 is slightly bent in order to be supported without application of a pressure by the socket part 3 on the outside of the holding arm 140 next to the through-opening 144.

The blocking element 51 also serves the dual detection of a complete or sufficiently complete movement of the radially insertable locking element 5 into its locking position on the holding element 4. In this dual detection, the position of the blocking element 51 and the radial movability of the holding arms 42, 43 cooperating with the radially insertable locking element 5 are detected, it being necessary for insertion of the radially insertable locking element 5 into its end position for the radially protruding portion 34 or the edge 32 of the socket part 3 to position the blocking element 51, or the terminal lug-shaped latching portion 52 thereof, in front of the through-opening or the window 144 and also for the holding arms 42, 43 to be fully deflected and to engage into the window or latching openings 35, 36. It is thereby possible to determine the insertion state of the radially insertable locking element 5.

As can likewise be seen particularly clearly in FIGS. 14a to 14l, the radially insertable locking element 5 is U-shaped when seen from above and has two mutually opposite legs 53, 54 and a transverse portion 55 arranged therebetween. The tongue-like blocking element 51 is arranged along the transverse portion 55, protruding approximately perpendicularly therefrom. It projects into the inner region of the U-shaped radially insertable locking element 5 spanned between the two legs 53, 54. The transverse portion 55 can, as shown, be provided on the outside with ribbing 155 for better, non-slip engagement. For protecting the tongue-like blocking element 51 and as spacer elements and for support, as guide elements and for preventing rotation, two dogs 56, 57 arranged on the left and right adjacent to the blocking element 51 are provided, which dogs can be seen particularly clearly in FIGS. 14c, 14d, 14f and 14g. The two dogs 56, 57 adjacent to the blocking element 51 serve in particular to protect the blocking element 51 from being accidentally bent or broken off in the incompletely inserted state of the radially insertable locking element 5 on the holding element 4 and additionally support the radially insertable locking element 5, in particular against rotation.

The radially insertable locking element 5 further has at the ends of each of the two legs 53, 54 a protruding anti-loss portion 156, 157 which is in part of stepped shape. The anti-loss portion engages in an interlocking manner with at least one portion of correspondingly complementary shape on the holding element 4; for the fully inserted state of the radially insertable locking element 5, this can be seen in particular in FIGS. 4, 4b and 18e. According to FIG. 4d it can be seen that, in the fully inserted position of the radially insertable locking element 5, the anti-loss portions 156, 157 are rounded on the outside in such a manner that an even end surface is formed externally on the holding element 4. If the radially insertable locking element 5 is in an incomplete insertion position, in particular in the preassembly position, as is shown in FIGS. 1a to 3g and 19, the anti-loss portions 156, 157 engage in an interlocking manner with the respective holding arm 42, 43 in the region of its respective actuating element 45, 46. Removal of the radially insertable locking element 5 from the holding element 4 is thereby prevented or made more difficult, so that the anti-loss portions 156, 157 form an anti-loss means for the radially insertable locking element 5 on the holding element 4 (see also FIG. 19).

The two legs 53, 54 of the radially insertable locking element 5 each further have a protruding guide web 158, 159, as can be seen in particular in FIGS. 14a to 14c, 14e, 14f and 14i, 14j and 14l. The protruding guide web serves to guide the radially insertable locking element 5 linearly during movement thereof during the radial insertion operation. The protruding guide webs 158, 159 accordingly engage in an interlocking manner with correspondingly complementary shaped surfaces or shoulders of the holding element 4, as can also be seen in particular in the enlarged view of the connector 1 in FIG. 19.

In FIG. 1, the radially insertable locking element 5 is merely arranged in a preassembly position on the holding element 4, wherein it engages with its two legs 53, 54 between the actuating elements 45, 46 and the bead-like protruding terminal edge 47. Both the holding element body 44 in the region of its bead-like protruding terminal edge 47 and the two legs 53, 54 of the radially insertable locking element 5 have protruding and recessed portions which are of corresponding complementary shape on the holding element 4 and the radially insertable locking element 5 and can accordingly interlock. This can be seen in particular in FIGS. 2*d*, 3*d* and 14*d*. In the preassembly position of the radially insertable locking element 5 on the holding element 4, the holding arms 42, 43 of the holding element are not yet blocked. This can be seen in particular in FIGS. 1 and 1*f*. The preassembly position of the radially insertable locking element 5 on the holding element 4 is thus a release position as regards the movability of the holding arms 40, 43 of the holding element 4.

Figure 2:
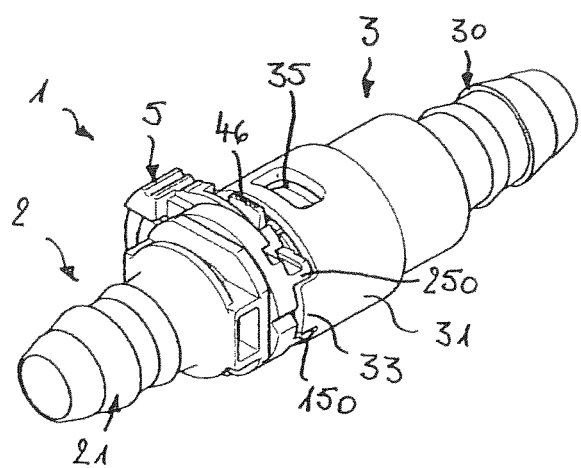
FIG. 2 is a perspective view of the connector according to FIG. 1 in a first incomplete pre-assembly or pre-insertion position of the plug part and the socket part with still blocked holding arms of the holding element on the plug part.

The socket part 3 is pushed onto the plug part 2 preassembled with the holding element 4 and the insertable locking element 5, as is shown in FIGS. 2 to 2*g*. The radially insertable locking element 5 thereby remains in the preassembly position, in which the holding arms 42, 43 thus remain freely resiliently movable in the radial direction of the plug part 2 as a result of the radially insertable locking element 5. Accordingly, the two mutually opposite holding arms 42, 43 are pressed radially in the direction towards the receiving portion 20 of the plug part 2 when the socket part 3 is pushed with its socket portion 31 onto the plug part 2 provided on its receiving portion 20 with the holding element 4. This can be seen in particular in FIG. 2*f*. As it crosses the latching lugs 40, 41, the socket portion 31 presses the holding arms 42, 43, on which the latching lugs 40, 41 are arranged, radially in the direction towards the receiving portion 20 of the plug part 2. The actuating elements 45, 46 thereby also move radially in the direction towards the plug part or recede, so that they protrude less far above the outer extent of the holding element body 44 than in the preassembly position, which is shown in FIG. 1. This can be seen in particular by comparing FIGS. 2 and 1. It is thus possible to recognize visually and optionally also haptically by touch that an incomplete insertion operation of the plug part 2 and the socket part 3 is present here. An unchecked insertion position is indicated by the incompletely pushed in radially insertable locking element 5. The radially insertable locking element 5 projects above the outer periphery of the holding element 4. If pressurized medium were to be sent through the connector 1 in this position, the plug part and the socket part would sooner or later become detached from one another. However, for safe use of the connector 1, the plug connection between the plug part and the socket part must be complete, which can be monitored via the radially insertable locking element, as described hereinbefore.

Figure 2F:
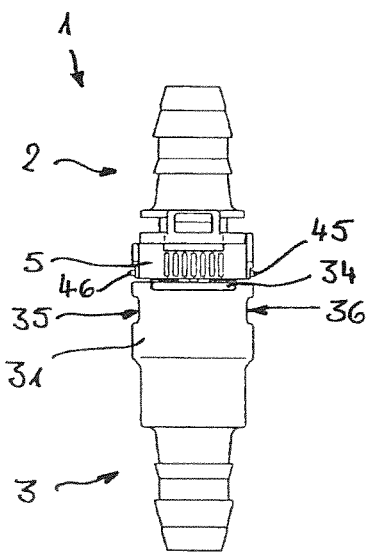
FIG. 2f is a longitudinal sectional view through the connector according to FIG. 2 along line B-B marked in FIG. 2e.
Figure 2F:
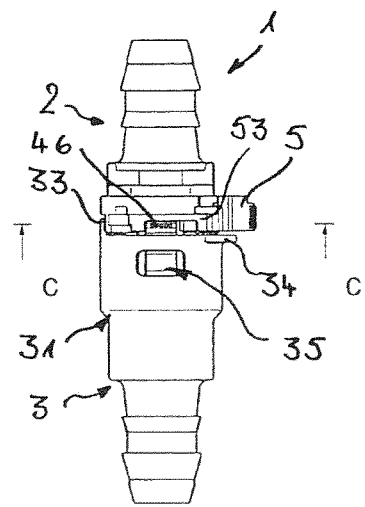
Figure 2F:
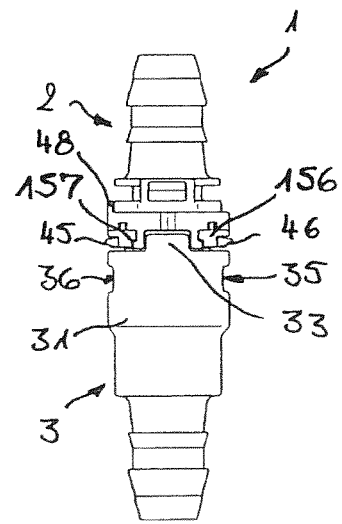
Figure 2F:
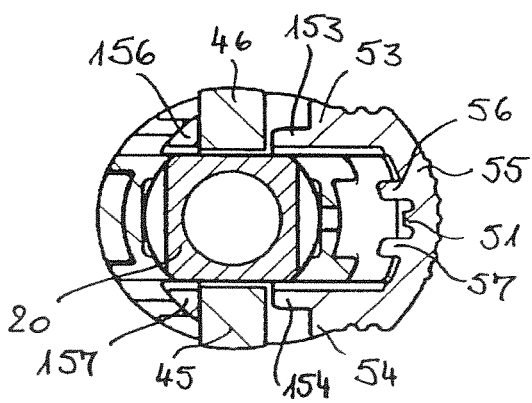
Figure 2F:
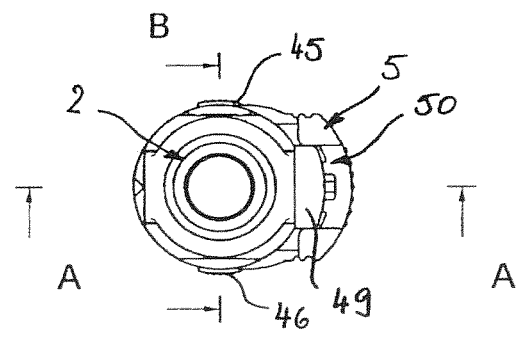
Figure 2F:
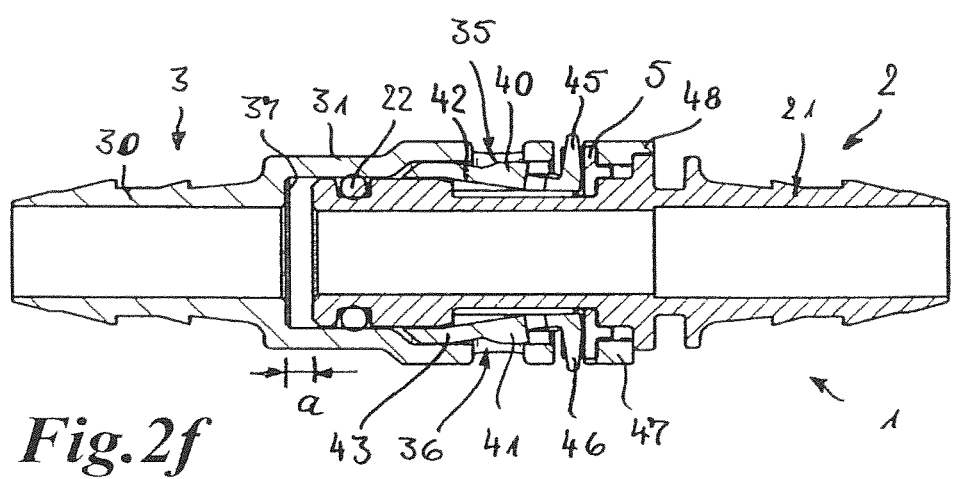

In the still incomplete insertion position of the plug part 2 and the socket part 3 shown in FIGS. 2 to 2*g*, a sealing ring or O-ring 22, which on a terminal portion of the plug part 2 in a peripheral groove therein, which is inserted first and accordingly deeply into the socket portion 31 of the socket part 3, rests in a sealing manner on the inner surface of the socket portion 31 in that region, as can be seen particularly clearly in FIGS. 2*f* and 2*g*. It can also be seen in particular in those figures that the plug part 2 has not yet been inserted fully into the socket part 3, because the latching lugs 40, 41 are not yet able to latch into the latching openings 35, 36 of the socket portion 31 of the socket part 3.

The fully inserted end position of the plug part 2 and the socket part 3 is shown in FIGS. 3 to 3*g*. This is already recognizable visually and haptically in particular from the actuating elements 45, 46 of the holding element 4 which again protrude radially far above the surface of the holding element 4. As can be seen in particular in FIGS. 3 and 3*f*, the latching lugs 40, 41 are in the latched position in the two latching openings 35, 36 in the socket portion 31 of the socket part 3. The latching lugs 40, 41 are supported in the latching openings 35, 36 and thus lock the assumed latching position of the plug part with the holding element 4 fitted thereto and the socket part 3. Because the socket portion 31 no longer presses radially against the latching lugs 40, 41 and thus the holding arms 42, 43, they are able to spring back into the starting position or preassembly position, as is also shown in FIGS. 1 to 1*f*, so that the actuating elements 45, 46 again protrude radially outwards far above the surface of the holding element body 44 arranged adjacent to the actuating elements 45, 46. This can be seen in particular in FIGS. 3 and 3*f*. The latched connection of the latching lugs 40, 41 in the latching openings 35, 36 of the socket portion 31 of the socket part 3 can be released by exerting a pressure radially in the direction towards the plug part 2, as indicated by the arrows P1 and P2. After the latching lugs 40, 41 have been threaded into and latched in the latching openings 35, 36 of the socket part 3, the holding element 4, which has been pushed onto the plug part 2, is held captively thereon and the insertion position of the plug part 2 with the holding element 4 and the socket part 3 is secured or blocked.

As can be seen in particular in FIG. 3*d*, the radially insertable locking element 5 continues to be in the preassembly position, that is to say has not been pushed further into the gap between the actuating elements 45, 46 and the bead-like protruding terminal edge 47 of the holding element 4. The additional block or locking of the plug connection between the socket part and the plug part with the holding element 4 fitted thereto that can be effected by the radially insertable locking element 5 is thus not yet active in the insertion state according to FIGS. 3 to 3*g*. The radially insertable locking element 5 is active as a locking device only in the insertion state according to FIGS. 4 to 4*g*. As can be seen in particular from the cross-sectional view along line C-C from FIG. 4*b* in FIG. 4*d*, the two legs 53, 54 of the radially insertable locking element 5 engage with their respective blocking portion 153, 154 behind the two holding arms 42, 43 of the holding element 4. Furthermore, the tongue-like blocking element 51 engages with its latching lug 52 into the through-opening 144 in the holding arm 140 of the holding element 4 and the two dogs 56, 57 flanking the blocking element 51 are supported on the surface of the holding arm 140. The latching lug 52 of the blocking element 51 can be supported in particular on the outside of the receiving portion 20 of the plug part 2, as has already been described and as can be seen in particular in FIG. 4*g*. Because the radially insertable locking element 5 rests in its inserted end position tightly, closely or in an interlocking manner on the outside of the plug part 2, the end position of the insertion operation of the radially insertable locking element 5 can be determined or monitored not only visually but also haptically. As can be seen in particular in FIGS. 4 and 4*e* and also 4*f*, the actuating elements 45, 46 continue to protrude beyond the surface of the holding element 4, in particular of the bead-like protruding terminal edge 47 thereof, whereby the plug connection between the plug part and the socket part cannot be released by exerting pressure in the direction of arrows P1 and P2 in the insertion state according to FIGS. 4 to 4g because it is prevented by the radially insertable locking element 5 which has been brought into its end position.

As can be seen in particular in FIGS. 3g and 4g, as well as in FIGS. 3f and 4f, a distance can continue to remain between the front side of the plug part 2, that is to say the portion of the plug part which is sealed by the O-ring 22 relative to the inside of the socket portion 31, and the shoulder 37 in the socket portion 31, which distance is denoted a1 in FIGS. 3g and 4g. In FIGS. 2g and 2f, on the other hand, a denotes the distance of the front side of the plug part 2 from the inside of the socket portion 31, which arises on account of the unlatched, that is to say only incompletely inserted, position of the plug part and the socket part.

FIGS. 5 to 5g likewise show the connector 1 on the one hand in the end position of the latching of the socket part 3 and the plug part 2 with the holding element 4 fitted thereto, and on the other hand in the end position of the radially insertable locking element 5, which secures the latching state of the socket part 3 and the plug part 2 provided with the holding element 4. Unlike in the embodiment according to FIGS. 1 to 4g, the socket part 300 according to FIGS. 5 to 5g is in the form of a machined part, in particular made of metal, and does not have a mandrel portion at the end. In its place, the socket part 300 is provided with a small fastening piece 301, for example for connection with a pipeline. Connection to a pipeline or also to a unit is thus possible via the fastening piece 301. The fastening piece 301 can be seen particularly clearly in section in FIGS. 5f and 5g. For connection to a pipeline, a unit, a machine, etc., different forms of connections of the connector 1 can be provided, such as a form as a socket part or portion, mandrel portion, threaded portion, etc. It is also possible to provide two coupling parts at the two sides/ends of the connector or of the socket part and/or of the plug part or of a connection in or to a machine with which the connector is to be connected.

Like the socket part 3, the socket part 300 has a socket portion 302 but, instead of the latching openings 35, 36 of the socket portion 31 of the socket part 3, it has an internal latching groove 303 with a latching surface 304. This can likewise be seen particularly clearly in FIGS. 5f and 5g. The latching lugs 40, 41 on the holding arms 42, 43 of the holding element 4, which is again arranged on the plug part 2, engage into the latching groove 303, whereby they are supported on the latching surface 304. Accordingly, the two actuating elements 45, 46 again protrude beyond the surface of the socket part 302 or the bead-like protruding terminal edge 47 of the holding element 4 on the plug part 2, as can be seen particularly clearly in FIGS. 5c, 5e and 5f and also in the perspective view of the connector in FIG. 5. As is shown in FIG. 5d, the two legs 53, 54 of the radially insertable locking element 5 again engage behind the two holding arms 42, 43 with their blocking portions 153, 154 and thus additionally secure the end position of the plug connection between the socket part 300 and the plug part 2 with the holding element 4 fitted thereto. The socket part 300 can, for example, consist of at least one metal, such as in particular aluminum, brass, steel or an alloy, such as an aluminum alloy. By contrast, the socket part 3, which is provided with the mandrel portion 30, can consist, for example, of a plastics material. The socket part, in both embodiments, can likewise consist of at least one plastics material and/or of at least one metal. The plug part 2 can consist both of a plastics material and of a metal, such as aluminum or an aluminum alloy. The choice of material for the plug part and the socket part can be governed by the particular application, that is to say in particular the plug part and the socket part can consist of the same material or of different materials, in particular plastics material and/or metal. The holding element can also consist of one or more plastics material(s) and/or one or more metal(s).

Figure 12:
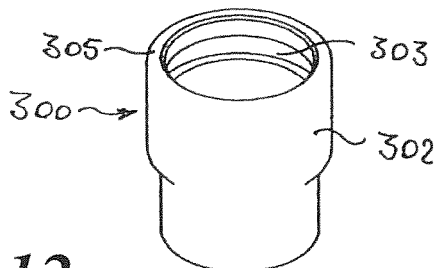
FIG. 12 is a perspective view of the socket part of the connector according to FIG. 5.
Figure 12A:
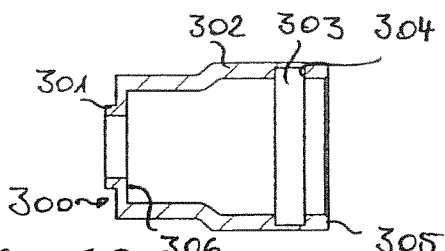
FIG. 12a is a longitudinal sectional view through the socket part according to FIG. 12, FIG. 13a to FIG. 13e are different perspective views of a holding element according to the invention for fitting to a receiving portion of a plug part of a connector.
Figure 13A:
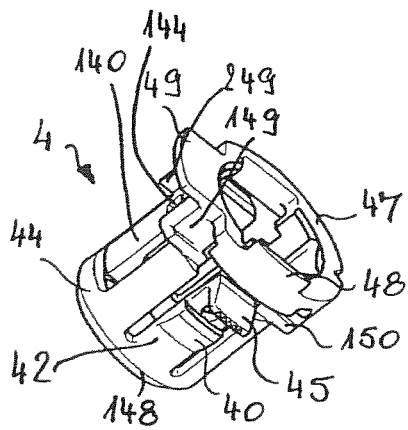
FIG. 13f is a top view of the holding element according to FIGS. 13a to 13e.
FIG. 13g is a first side view of the holding element according to FIGS. 13a to 13e.
FIG. 13h is a side view, rotated through 90° relative to the view in FIG. 13g, of the holding element according to FIGS. 13a to 13e.
FIG. 13i is a side view, rotated through 180° relative to the view in FIG. 13h, of the holding element according to FIGS. 13a to 13e.
FIG. 13j is a bottom view of the holding element according to FIGS. 13a to 13e.
FIG. 13k is a longitudinal sectional view of the holding element according to FIGS. 13a to 13e, cut along line D-D from FIG. 13j.
FIG. 13l is a further longitudinal sectional view of the holding element according to FIGS. 13a to 13e, cut along line E-E from FIG. 13j, FIG. 14a to FIG. 14e are perspective views of a locking device according to the invention, here in the form of a U-shaped radially insertable locking element.
Figure 13B:
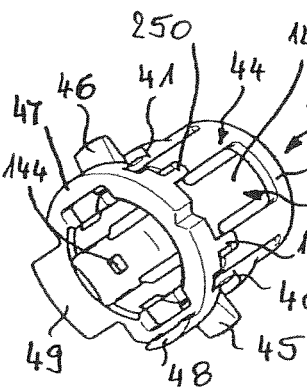
Figure 13C:
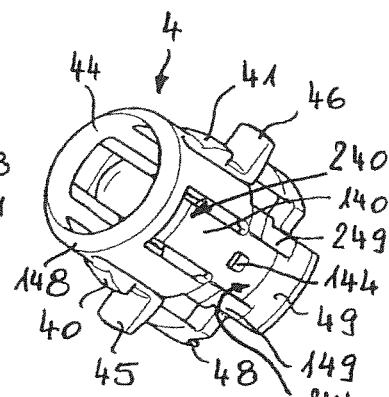
Figure 13D:
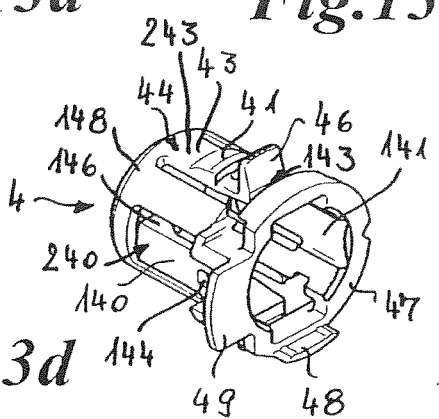
Figure 13E:
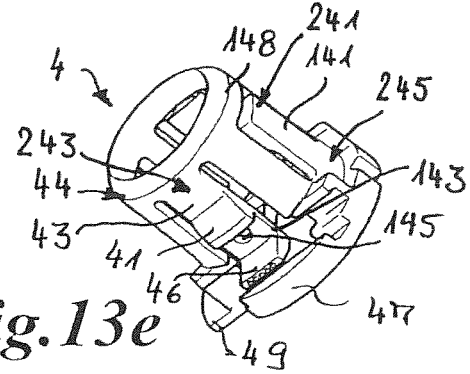
Figure 13F:
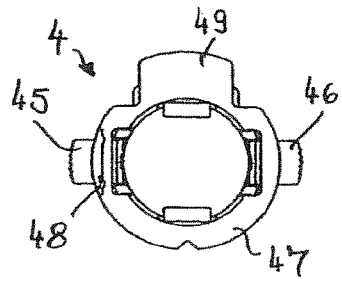
Figure 13G:
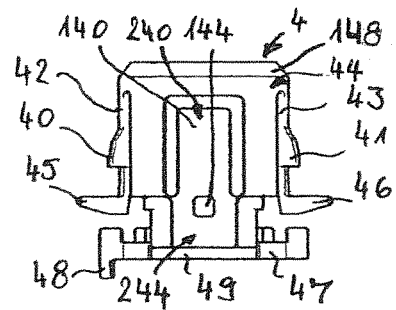
Figure 13H:
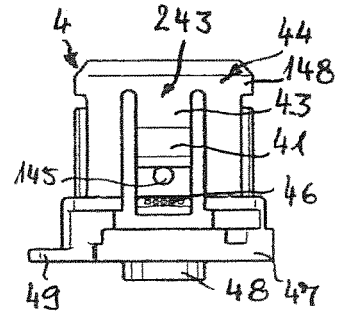
Figure 13I:
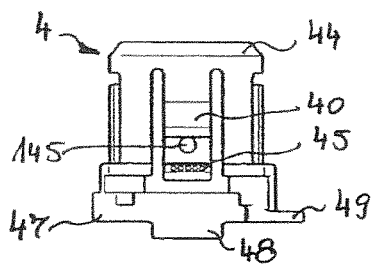
Figure 13J:
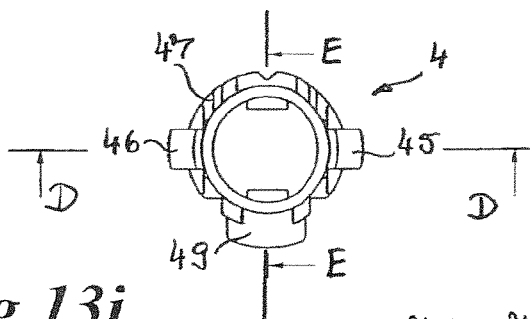
Figure 13K:
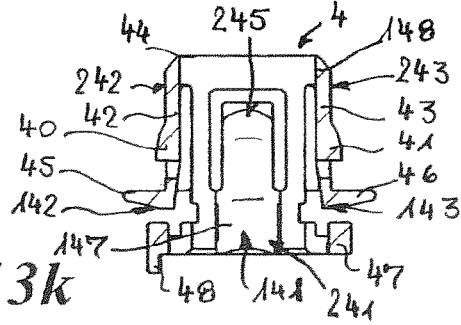
Figure 13L:
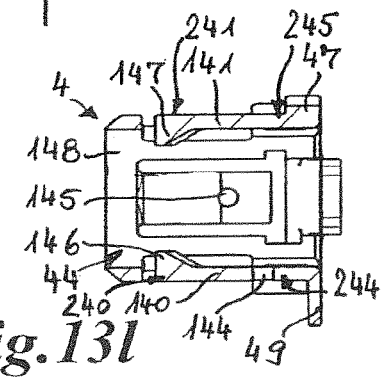

In the latched end position of the plug part 2 with the holding element 4 fitted thereto and the socket part 300, a distance a2 remains, at least in the embodiment shown, between the front side of the plug part 2, whereby the O-ring 22 on the plug part again serves to seal the plug part relative to the inner surface of the socket part 302, and a shoulder 306 in the socket part 300, as can be seen in FIG. 5g and also FIG. 5f and FIG. 12a.

FIGS. 6 to 6g show the connector 1 with the socket part 3 not yet fitted to the plug part 2, but the radially insertable locking element 5 has already been inserted into the holding element 4 into its end position, that is to say the fully inserted position. Accordingly, the holding arms 42, 43 are prevented from permitting substantially radial deflection in the direction towards the plug part 2. Actuation of the actuating elements 45, 46 is thus not possible because they are prevented by the legs 53, 54 of the radially insertable locking element 5 from being moved and are thereby blocked. This can be seen in particular in the cross-sectional view in FIG. 6d. It is accordingly not possible to push and latch the socket part 3 with its socket portion 31 onto the plug part 2 with the holding element 4 fitted thereto, because the latching lugs 40, 41 cannot be moved radially inwards in the direction towards the plug part 2, and thus disappear, in order to slide inside the socket portion 31 until they are in alignment with the latching openings 35, 36 in the socket portion 31 of the socket part 3 and can engage in a latching manner into the latching openings. A latching connection of the plug part with the holding element and the socket part is thus not possible when the radially insertable locking element 5 has been inserted, that is to say brought into the end position. The fully inserted state, that is to say the end position, of the radially insertable locking element 5 on the plug part 2, or holding element 4, can readily be ascertained both visually and haptically, thus for the radially insertable locking element 5 incorrect assembly, which prevents latching of the plug part and the socket part. In order to enable the socket part and the plug part with the locking element fitted thereto to be fitted together again and latched, the radially insertable locking element 5 must be released from its end position again and brought, for example, into the position shown in FIGS. 1 to 1g and 19.

Figure 8:
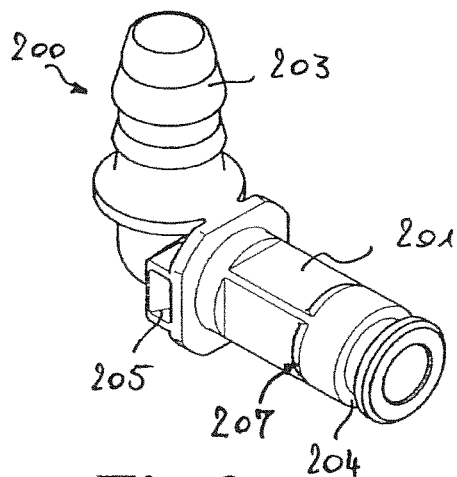
FIG. 8 is a perspective view of a further embodiment of a right-angle plug part according to the invention, in which the receiving portion for receiving a holding element is in polygonal form in order to provide an anti-rotation means for the holding element fitted thereto.
Figure 8A:
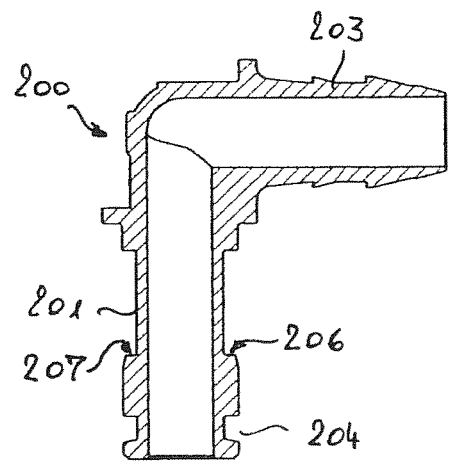
FIG. 8a is a longitudinal sectional view of the right-angle plug part according to FIG. 8.

In each of the figures described hereinbefore, straight plug parts and straight socket parts are shown. FIGS. 7, 7a and 8, on the other hand, show right-angle plug parts 200. In each of FIGS. 9, 9a and 10, 10a, straight plug parts 2 are again shown. In all the plug parts 2 and 200, the receiving portion 20 or 201 is in each case polygonal in order to provide an anti-rotation means for the holding element 4 fitted thereto. However, it is likewise also possible to form the plug part 2 or 200 with a round cross-section in the region of its receiving portion 20 or 201. In particular when the provision of an anti-rotation means is not required there or when a different type of anti-rotation means is provided, the plug part can have a round cross-section throughout. Mixed forms of a round cross-section and flattened portions or at least one flattened portion are also possible along the peripheral surface in particular of the receiving portion 20 or 201 of the plug part 2 or 200.

Figure 9:
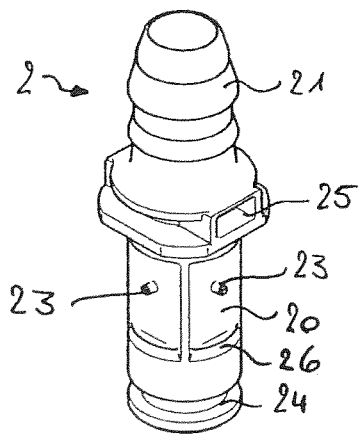
FIG. 9 is a perspective view of a plug part in the form of a straight plug part having a protruding elements provided with protruding elements for forming a pressure locking device in conjunction with a holding element fitted to the receiving portion of the plug part.
Figure 9A:
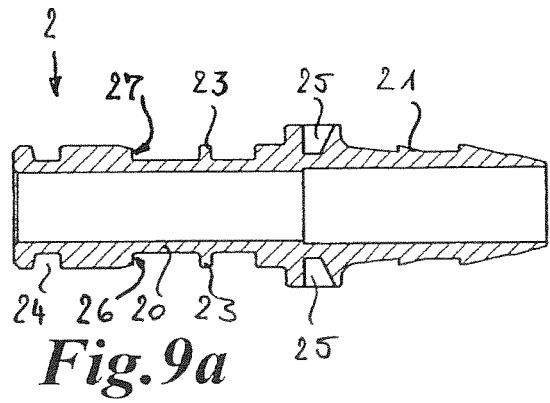
FIG. 9a is a longitudinal sectional view through the plug part according to FIG. 9.
Figure 10A:
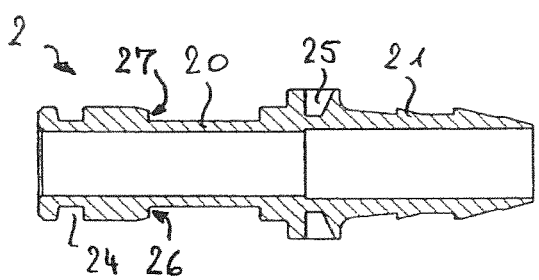
FIG. 10a is a longitudinal sectional view through the plug part according to FIG. 10.
Figure 10:
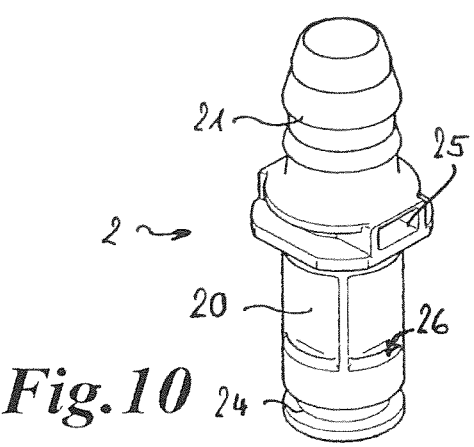
FIG. 10 is a perspective view of a straight plug part having a polygonal receiving portion for forming an anti-rotation means for a holding element fitted thereto.
Figure 17A:
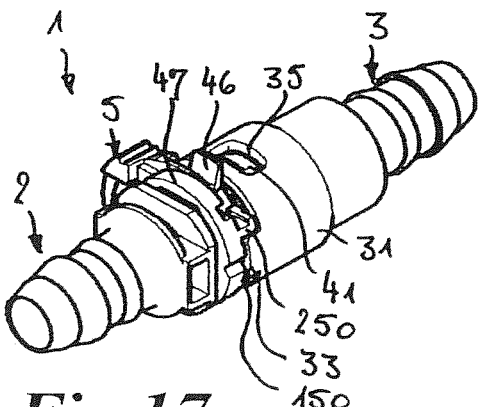
FIG. 17a is a further perspective view of a connector according to the invention in the embodiment according to FIG. 1.
Figure 17B:
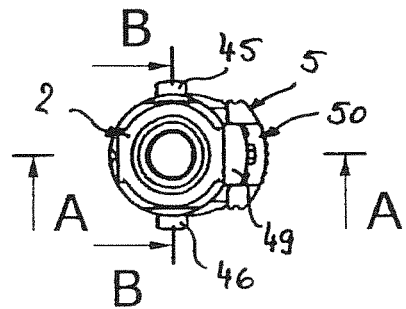
FIG. 17b is a front view of the plug part of the connector according to FIG. 17a, FIG. 17c is a first longitudinal sectional view of the connector according to FIG. 17a, cut along line A-A from FIG. 17b.
Figure 17C:
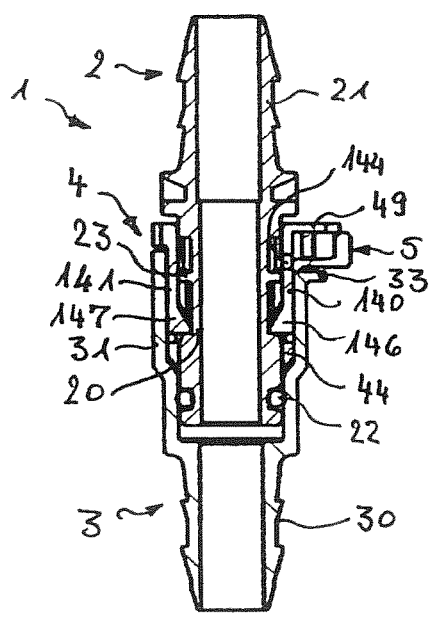
FIG. 17d is a second longitudinal sectional view of the connector according to FIG. 17a, cut along line B-B from FIG. 17b, wherein an enlarged detail view in the region of the blocked pressure locking device is additionally shown.
FIG. 17e is a side view of the connector according to FIG. 17a, wherein an enlarged detail view in the region of the blocked pressure locking device is additionally shown.
Figure 17D:
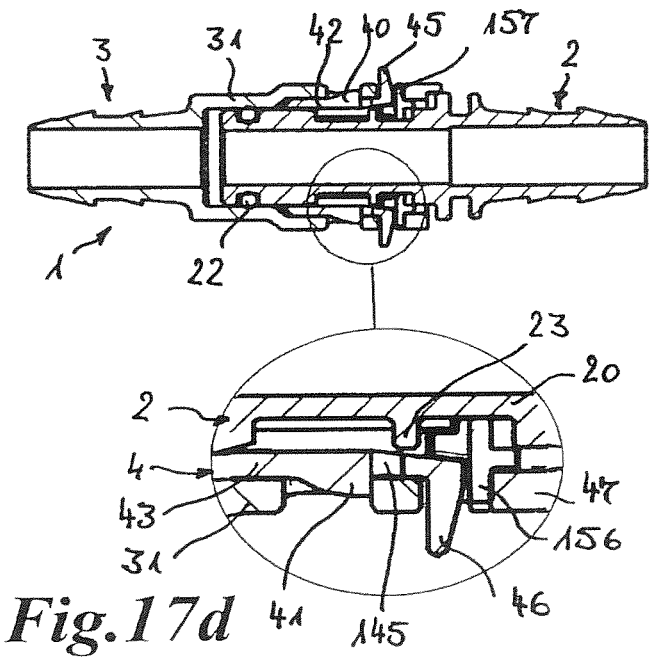
Figure 17E:
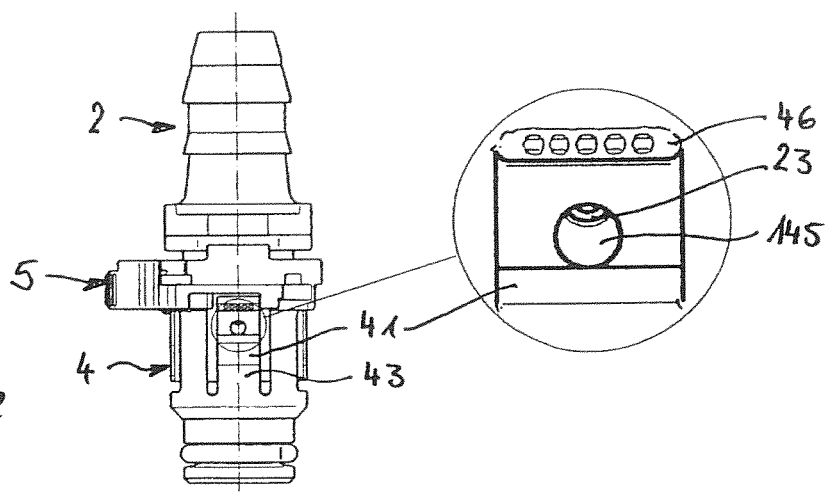

In the plug part 200 according to FIG. 7 and the plug part 2 according to FIG. 9, protruding pin elements 23 and 202 are provided on each of the four surfaces of the respective polygonal receiving portion 20 and 201. The protruding pin elements 23 and 202 serve to provide a pressure lock when there is pressure inside the plug part 2 or 200, that is to say when pressurized medium is flowing through the plug part. For pressure locking, the protruding pin elements 23, 202 are located outside a respective opening 145 in the holding arms 42, 43, as a result of displacement of the holding element 4 relative to the plug part 2 in the axial direction of the holding element 4. A radial movement of the holding arms 42, 43 is thereby blocked, as is shown in FIGS. 17d and 17e. The axial play of the holding element 4 on the receiving portion 20 of the plug part 2 that is provided is thus such that the holding element is at least sufficiently far away from the opening 145 into which the at least one protruding pin element 23, 202 dips, so that the holding arms 42, 43 are then not in a release position when the protruding pin element 23, 202 is situated outside the opening 145. As a result of the axial displacement between the plug part 2 and the holding element 4 that occurs when there is pressure inside the connector 1, the protruding pin elements 23, 202 are displaced out of the region in which they are aligned with the openings 145 and thus block the holding arms 42, 43 radially. Actuation of the holding arms 42, 43 in order to release their latching lugs 40, 41 from latching in the latching openings 35, 36 in the socket part 3 is thus prevented in that position. Only when the holding element 4 and the plug part 2 are in the position in which they are not axially displaced are the protruding pin elements 23, 202 able to dip into the openings 145 and thus actuation of the holding arms 42, 43 is possible only when there is no media pressure inside the connector 1. The openings 145 in the two holding arms 42, 43 can be seen in particular in FIGS. 13e, 13h, 13i and 13l. Such a freed pressure lock is shown in FIGS. 16a to 16e, in particular 16d, while FIGS. 17a to 17e show a blocked pressure lock in which the protruding pin elements 23 and 202 are not able to dip into the respective opening 145 in the two holding arms 42, 43. For a pressure lock, axial movability of the holding element relative to the plug part is thus provided. When there is no media pressure inside the connector, it is possible to release the plug part from the socket part. By manually inserting the plug part 2 as far as the stop, that is to say into the furthest possible position inside the socket part, manual unlocking of the latching lugs 40, 41 of the holding arms 42, 43 from their latching in the latching openings 35, 36 or from a shoulder or an undercut surface as the latching surface 304, 405 in the socket part can take place.

As is likewise apparent from FIGS. 16a to 16e and 17a to 17e, the radially insertable locking element 5 in those figures is not or has not yet been brought into its end position, that is to say it still perceptibly protrudes laterally above the surface in particular of the plug part but also of the socket part. When a pressure lock is provided, it is sufficient to provide the plug part 2 and the socket part 3. The radially insertable locking element 5 can thereby be omitted.

Apart from the right-angle shape, the plug parts 2 and 200 according to FIGS. 7, 7a, 8, 8a, 9, 9a and 10, 10a do not differ from one another, because all the plug parts are designed for the expansion fitting in particular of pipelines or hose lines and accordingly each have a mandrel portion 21 or 203.

As can be seen from the plug parts 2 to 200 in FIGS. 7 to 10a but also from the other plug parts in the figures already described hereinbefore, those plug parts each have not only a receiving groove 24 or 204 for receiving the sealing ring or O-ring 22 at one end, but also a respective engagement opening or two mutually opposite engagement openings 25, 205 between the receiving portion 20 or 201 and the respective mandrel portion 21 or 203. These engagement openings serve for engagement, for example, by a robot arm for carrying out automated assembly of the connector 1. Instead of such engagement openings 25, 205, other engagement surfaces may also be provided which can be gripped by robots or engaged during automated assembly in order on the one hand to provide the respective plug part 2 or 200 with the respective holding element 4 and on the other hand to permit correct assembly of the holding element 4 on the plug part, as well as subsequently correct assembly of the radially insertable locking element 5 on the holding element 4 and optionally also of the respective socket part 3 or 300 on the plug part with the holding element and the radially insertable locking element.

FIGS. 11, 11a and 12, 12a again show the socket part 3 and the socket part 300 on their own. In the socket part 300, the fastening piece 301 arranged at the end can clearly be seen, as can the latching groove 303 provided inside the socket portion 302 with its latching surface 304 for engagement of a respective latching lug 40 or 41 of the holding arms 42, 43 of the holding element 4, which is fitted to the respective plug part 2 or 200. It is likewise apparent, when the socket part 3 is compared with the socket part 300, that, in the case of the socket part 300 in the form of a machined part made of metal, portions do not project either radially or axially from the upper edge 305, thus interlocking with corresponding grooves or webs, such as the axial webs 150, 250, is not provided. The reason for this is in particular that there are no latching openings in the form of window openings 35, 36 through which the latching lugs 40, 41 must engage as exactly as possible in order to effect latching of the latching lugs 40, 41 thereon, but instead the latching groove 303 is provided, which is provided all round the inside of the socket portion 302 so that the particular position of the latching lugs 40, 41 along the latching groove 303, based on the peripheral extent thereof, is random. The situation is different, as already discussed hereinbefore, with the socket part 3 provided with window openings or latching openings 35, 36, in which both the axially protruding portion 33 and the radially projecting portion 34 ensure correct positioning of the socket part 3 on the plug part 2 or plug part 200 with the holding element 4 fitted thereto.

Figure 18D:
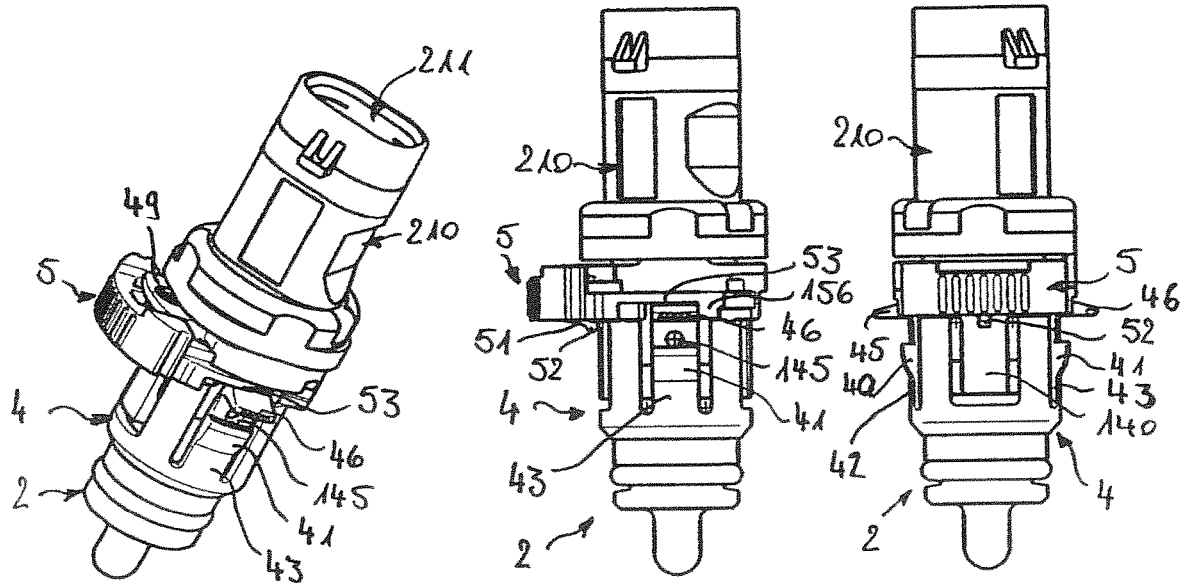
FIG. 18a is a perspective view of a further embodiment of a connector according to the invention having a sensor instead of a second media connection.
FIG. 18b is a side view of the connector according to FIG. 18a, FIG. 18c is a side view, rotated through 90° relative to FIG. 18b, of the connector according to FIG. 18a, FIG. 18d is a top view of the sensor of the connector according to FIG. 18a, and FIG. 19 is a perspective view of the plug part of the connector according to FIG. 1 in an enlarged view relative thereto.
Figure 18D:
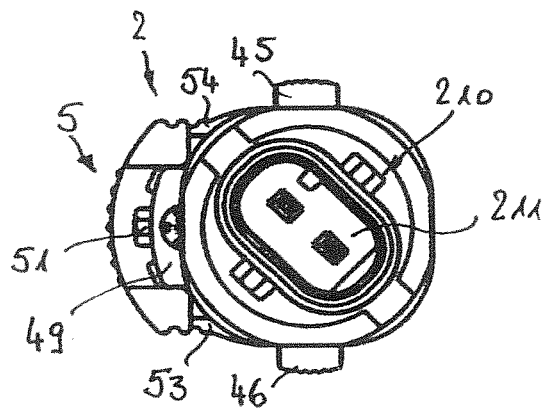

FIGS. 18a to 18d show the connector 1 in which the plug part 2 is provided at the end with a sensor 210 instead of a mandrel portion or another connecting portion. The sensor 210 is fitted to the plug part 2 or connected thereto by a material-bonded connection and has at the end an electrical and/or data connection 211, as can be seen in particular in the top view thereof in FIG. 18d. The sensor 210 can be connected via the electrical and/or data connection 211 to an electrical power source and/or a data acquisition and/or processing unit (not shown). At the opposite end of the plug part 2, which is provided with the receiving portion 20 with the holding element 4 fitted thereto and the radially insertable locking element 5 fitted thereto in the preassembly position, the socket part 3 can again be fitted, as described above. FIGS. 18b, 18c in particular clearly show the blocking element 51 with the terminal latching lug 52, which rests on the outside of the holding arm 140 and can be actuated by the socket part 3 or the radially projecting portion 34 thereof and guided into the opening 144 in the holding arm 140.

FIGS. 15a to 15d show, in the manner of a modular system, the various types of plug parts and socket parts which can be combined with one another as desired. For latching the plug part and the socket part, the holding element 4 is provided in each case and, for the additional blocking of the latched position of the plug part with the holding element and the socket part, the radially insertable locking element 5 is provided on the holding element 4. For sealing the plug part 2 or 200 in the respective socket part, the sealing ring or O-ring 22 is further also shown.

Instead of the socket parts 3 with a mandrel portion 30 and the socket part 300 in the form of a machined part which have already been described above, FIGS. 15a to 15d additionally show the variant of a socket part 400 having a hexagonal portion 401, wherein the socket part 400 is intended for screw connection with a pipeline or a unit, wherein engagement and holding during screwing on of the socket part 400 is accordingly possible via the hexagonal portion. For connection to a pipeline, the socket part 400 has a connecting portion 402. Connection with the plug part 2 or 200 with the holding element 4 fitted thereto is again possible via a socket portion 403. The socket portion 403, corresponding to the socket portion 302 of the socket part 300, likewise has a latching groove 404 with a latching surface 405 for the latching of the latching lugs 40 and 41 on the holding arms 42 and 43 of the holding element 4.

Accordingly, the three variants of socket parts 3, 300 and 400 can be combined, for example, with one of the variants of plug parts 2 and 200. In FIGS. 15a to 15d, the plug parts 2 and 200 are each shown without protruding pin elements 23 and 202. However, these may likewise be arranged on the respective receiving portions 20 and 201 in order to provide a pressure lock.

Figure 15A:
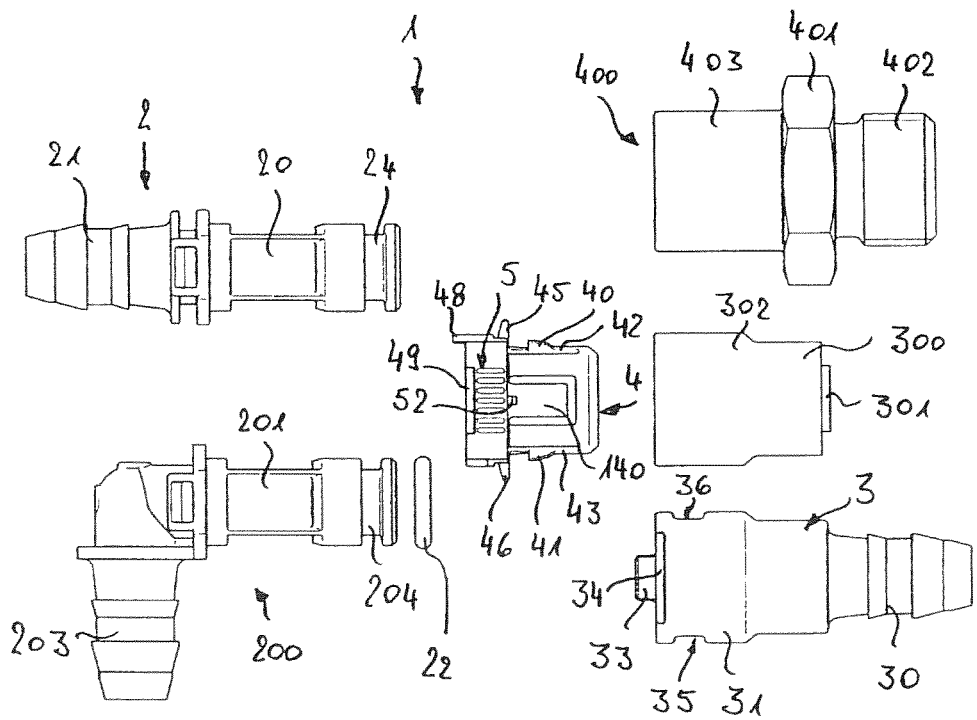
FIG. 15a shows a modular arrangement of a straight plug part according to the invention and of a right-angle plug part according to the invention having an O-ring as a sealing ring, of a holding element according to the invention having a locking device for fitting to the respective receiving portion of the respective plug part, and of three different socket parts for combination with the plug parts.
Figure 15B:
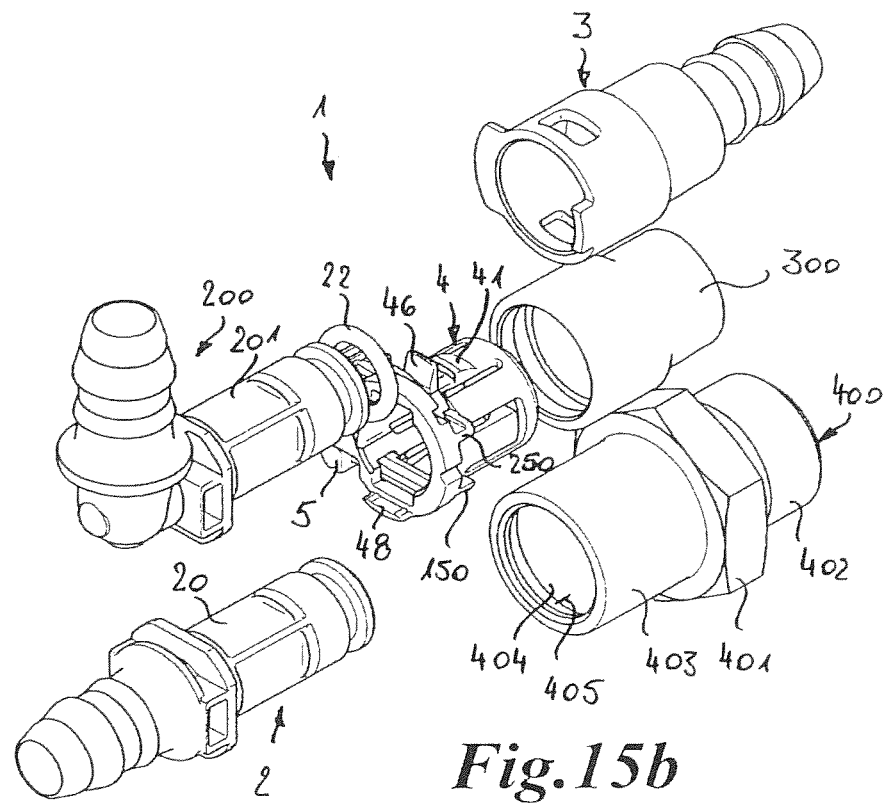
FIG. 15b is a perspective view of the modular arrangement of the two plug parts and three socket parts and also of the holding element having the locking device according to FIG. 15a, FIG. 15c is a further perspective view of the modular arrangement of the two plug parts, three socket parts and of the holding element according to FIG. 15a, wherein the holding element is provided with a locking device according to the invention inserted in the release position.
Figure 15C:
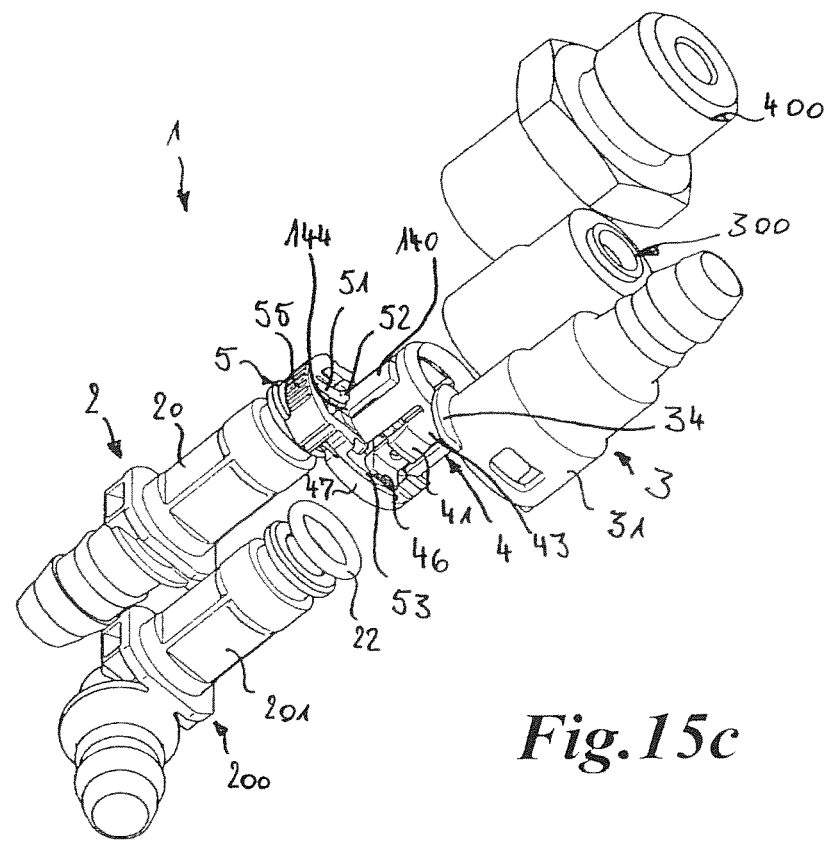
FIG. 15d is a further perspective view of the modular arrangement according to FIG. 15a, comprising the two plug parts and three socket parts and also the holding element, which here too is again provided with the locking device inserted in a release position.
Figure 15D:
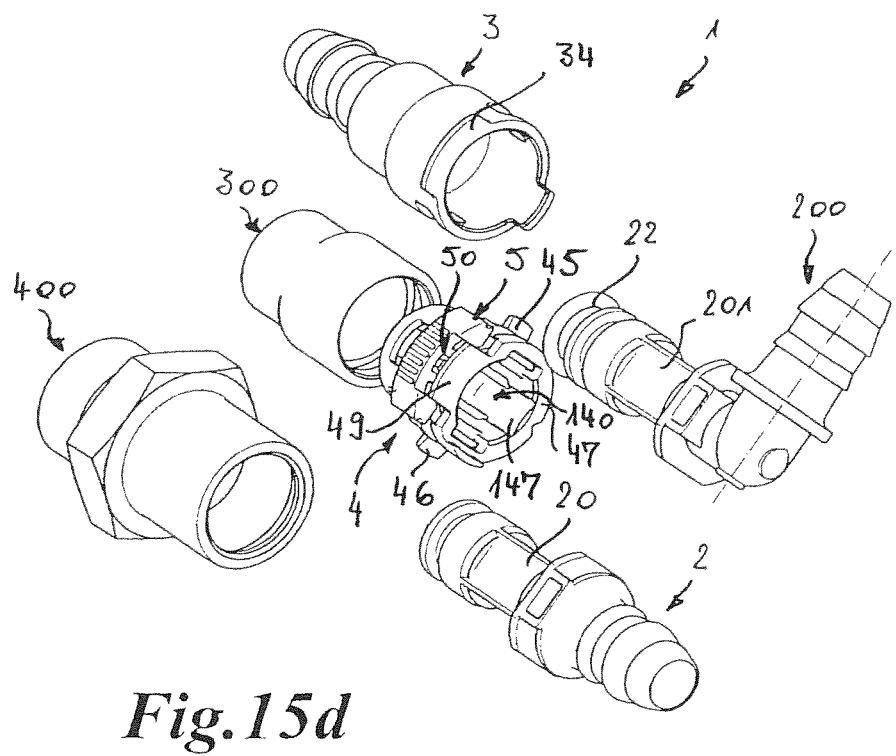
Figure 16A:
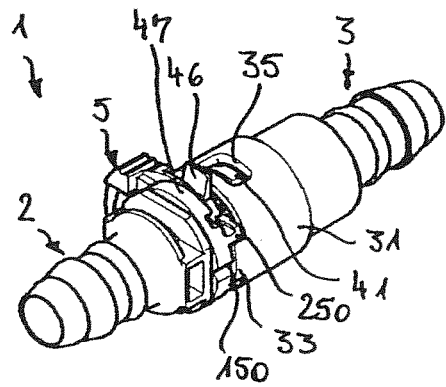
FIG. 16a is a perspective view of a connector according to the invention according to FIG. 1, wherein the connector is in a released pressure locking position.
Figure 16B:
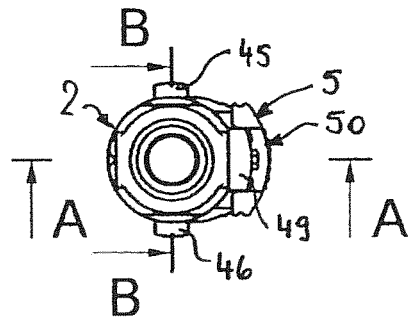
FIG. 16b is a front view of the plug part of the connector according to FIG. 16a, FIG. 16c is a longitudinal sectional view through the connector according to FIG. 16a along line A-A from FIG. 16b.
Figure 16C:
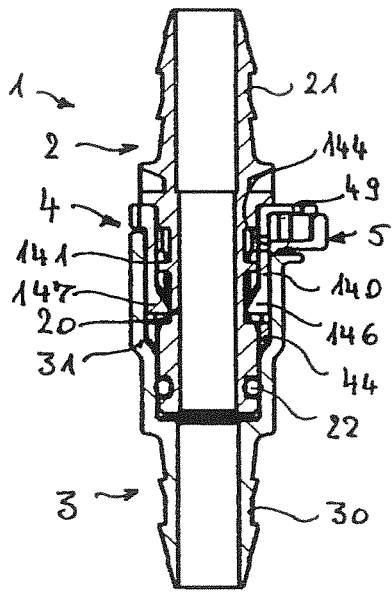
FIG. 16d is a longitudinal sectional view of the connector according to FIG. 16a, cut along line B-B from FIG. 16b, wherein, in order to illustrate the free position of the pressure lock, a detail in the region of the holding arms of the locking element is shown on an enlarged scale.
FIG. 16e is a side view of the connector according to FIG. 16, wherein, in order to illustrate the free position of the pressure lock, a detail in the region of a holding arm of the holding element is shown on an enlarged scale.
Figure 16D:
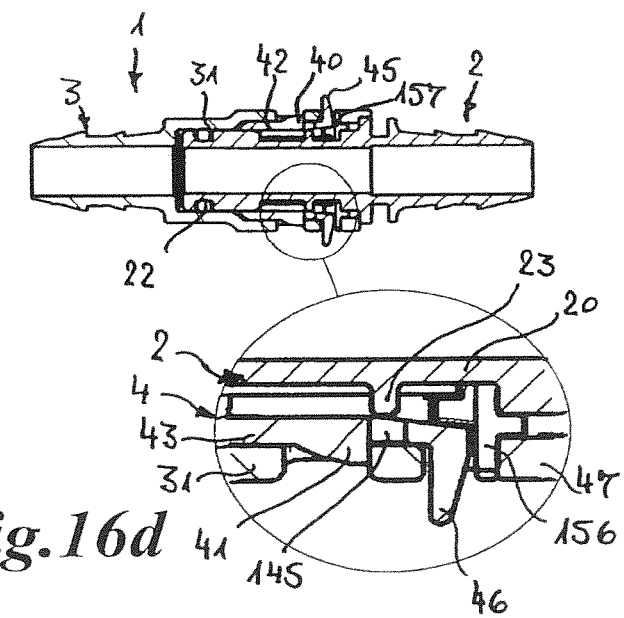
Figure 16E:
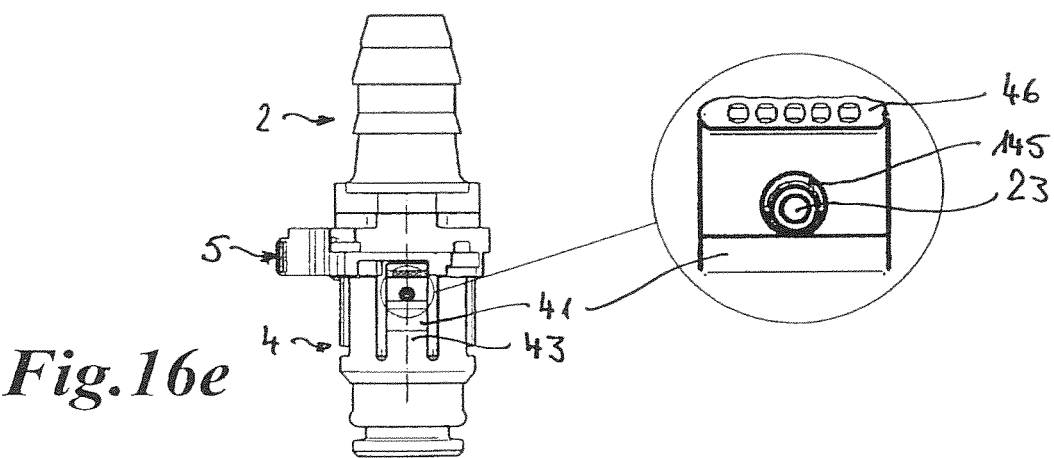

FIG. 15c shows particularly clearly, in a perspective view, the preassembly position of the radially insertable locking element 5 on the holding element 4. The blocking element 51 thereby still bears with its latching lug 52 on the outside of the holding arm 40 of the holding element 4, adjacent to but not yet in engagement with the through-opening 144. It will likewise be seen that can be engaged by the radially projecting portion 34 on the blocking element 51 and this can be pressed in the insertion direction of the socket part 3, in the direction towards the plug part 2, and the latching lug 52 can thereby be pressed into position in alignment above the through-opening. In the latter position, it is possible to press the radially insertable locking element 5 into its end position, provided that the holding elements 42, 43 are completely deflected, whereby the blocking element 51 is located in the through-opening 144 and the latching lug 52 latches inside the holding element 4 on the underside of the holding arm 40 at the edge bordering the through-opening 144, that is to say is retained on the inside on the holding arm 40 and counteracts unintentional removal of the blocking element 51 with the latching lug 52. FIG. 15c likewise shows the arrangement of the leg 53 adjacent to the holding arm 43 with the latching lug 41 and the actuating element 46.

By providing the radially insertable locking element 5, an additional blocking function for the holding arms 42, 43 of the holding element 4 is thus possible. This brings advantages in terms of an improved and more reliable plug connection not only in respect of forces acting in the removal direction of the plug part and the socket part, but also in the case of lateral loading forces on the inserted connector.

The radially insertable locking element 5, or the locking device, accordingly has as its main function the securing of the inserted plug part and socket part against unintentional release. Furthermore, insertion monitoring takes place in two respects, on the one hand in that the radially insertable locking element, or the locking device, merely has to be actuated once the plug part is inserted fully into the socket part, and on the other hand in that the plug part is not insertable when the radially insertable locking element, or the locking device, is in the locking position. A blocking function against unintentional pushing of the locking element into the opening in the holding element is also provided. In addition, a dual detection of the insertion state in the region of the holding arms and in respect of the tongue-like blocking element and its terminal lug-shaped latching portion takes place. Furthermore, the radially insertable locking element, or the locking device, has a support function for the plug part, the socket part and the holding element. Appearance and/or haptics can likewise be ascertained in order to be able to determine a correct insertion position of the plug part and the socket part. In addition, the radially insertable locking element, or the locking device, has an anti-loss means in order to be held captively on the holding element, in particular in a (first) preassembly position.

In addition to the variants of connectors described hereinbefore and shown in the exemplary embodiments, which are intended in particular for hose lines and/or pipelines, many further variants can also be formed, including any desired combinations of the features mentioned hereinbefore of the respective connectors, in which in each case at least one socket part and at least one plug part are provided, wherein the plug part can be inserted or is inserted into a socket portion of the socket part and wherein a holding element is provided for releasably locking the plug part into the socket part, wherein the holding element can be mounted or is mounted captively on a receiving portion of the plug part and has at least one portion which is radially expandable and comprises at least one holding arm which is provided with at least one protruding latching lug on its outer surface, wherein the holding arm is movable resiliently in the radial direction relative to the plug part in order to be able latch the at least one latching lug on at least one latching surface or latching opening of the socket part and to release it from the latching position again, wherein at least a second locking device is provided for locking and blocking the latching position of the plug part and the locking element and the socket part.

LIST OF REFERENCE NUMERALS 1 connector
2 plug part
3 socket part
4 holding element
5 radially insertable locking element
20 receiving portion
21 mandrel portion
22 sealing ring/O-ring
23 protruding pin element
24 receiving groove
25 engagement opening
26 shoulder
27 shoulder
30 mandrel portion
31 socket portion
32 upper edge
33 axially protruding portion
34 radially projecting portion
35 window opening/latching opening
36 window opening/latching opening
37 shoulder
40 latching lug 41 latching lug
42 holding arm
43 holding arm
44 holding element body
45 actuating element
46 actuating element
47 bead-like protruding terminal edge
48 protruding portion
49 radial portion
50 groove/cut-out
51 blocking element
52 latching lug
53 leg
54 leg
55 transverse portion
56 dog
57 dog
140 holding arm
141 holding arm
142 free end
143 free end
144 through-opening
145 opening
146 latching lug on 140
147 latching lug on 141
148 continuous edge
149 axial web
150 axial web
153 blocking portion
154 blocking portion
155 ribbing
156 anti-loss portion
157 anti-loss portion
158 guide web
159 guide web
200 right-angle plug part
201 receiving portion
202 protruding pin element
203 mandrel portion
204 receiving groove
205 engagement opening
206 shoulder
207 shoulder
240 free end
241 free end
210 sensor
211 electrical and/or data connection
242 fixed end
243 fixed end
244 fixed end
245 fixed end
249 axial web
250 axial web
300 socket part
301 fastening piece
302 socket part
303 latching groove
304 latching surface
305 upper edge
306 shoulder in socket part
400 socket part
401 hexagonal portion
402 connecting portion
403 socket portion
404 latching groove
405 latching surface a distance between front side of plug part 2 and shoulder 37 in socket part 3 in the unlatched position
a1 distance between front side of plug part 2 and shoulder 37 in socket part 3 in the end position
a2 distance between front side of plug part 2 and shoulder 306 in socket part 300 in the end position
P1 pressure
P2 pressure

What is claimed is:

1. A connector for hose lines and/or pipelines, comprising:
at least one socket part and at least one plug part,
wherein the plug part can be inserted or is inserted into a socket portion of the socket part,
wherein at least one holding element is provided for releasably holding the plug part in the socket part,
wherein the socket part, the plug part, and the holding element are distinct, individual pieces, and
wherein the plug part can be connected to or is connected with the holding element,
wherein the holding element has at least one holding arm having at least one protruding latching lug on an outer surface of the at least one holding arm,
wherein the at least one holding arm has a free end and an end fixed to the holding element body and is resiliently movable in a radial direction relative to the plug part in order to latch the at least one latching lug on at least one latching surface or a latching opening of the socket part and to release the at least one latching lug therefrom,
wherein at least one locking device is provided for securing a latching state of the plug part and the socket part and for indicating incorrect assembly thereof, wherein the at least one locking device cooperates with the at least one holding element, wherein the at least one locking device is a radially insertable locking element which cooperates with the holding element in a region of the at least one holding arm thereof.

2. The connector as claimed in claim 1, wherein the radially insertable locking element, when seen from above, is U-shaped with two legs and a transverse portion arranged therebetween, wherein at least a portion of the legs or on the legs serves for engagement between the free end of the at least one holding arm and the plug part.

3. The connector as claimed in claim 2, wherein the legs of the radially insertable locking element have such a shape and are at such a distance from one another that, when fitted completely onto the holding element, the legs engage two mutually opposite holding arms of the at least one holding element in order to hold the two holding arms radially in a spaced apart position relative to the plug part.

4. The connector as claimed in claim 3, wherein the legs have blocking portions for engaging in a blocking manner behind the holding arms of the holding element.

5. The connector as claimed in claim 2, wherein the transverse portion of the radially insertable locking element is provided with at least one protruding blocking element which can be engaged or engages in at least one opening in the holding element.

6. The connector as claimed in claim 5, wherein the blocking element is tongue-like and has an end that is fastened to the transverse portion or fixed and a free end, wherein the free end is provided at the end with at least one protruding lug-shaped latching portion.

7. The connector as claimed in claim 6, wherein the blocking element and an edge or a radially projecting portion of the socket part are capable of cooperating or cooperate in such a manner that the blocking element can be axially freed by the edge or a radially projecting portion and guided into the at least one opening of the holding element.

8. The connector as claimed in claim 6, wherein the lug-shaped latching portion serves to prevent the locking device from being radially displaced into a locking position in which the blocking element engages into the at least one opening in the holding element, and for securing the blocking element against automatically moving out, sliding out or being released from the at least one opening.

9. The connector according to claim 6, wherein a transport lock position of the locking device is provided, wherein the at least one blocking element prevents the locking device from being capable of being brought into an end position of the locking device when the plug part and the socket part are not fully inserted.

10. The connector according to claim 9, wherein the at least one blocking element prevents the locking device from being pushed into the end position when the plug part and the socket part are not fully inserted.

11. The connector according to claim 6, wherein the locking device can be brought fully into an end position of the locking device only when the blocking element projects into the opening and/or the lug-shaped latching portion of the blocking element is located in the opening and the holding arms of the holding element are radially movable.

12. The connector as claimed in claim 1, wherein the plug part is provided with at least one device for pressure locking which cooperates with the holding element, which device prevents the holding element from being unlocked when there is media pressure inside the connector.

13. The connector as claimed in claim 12, wherein a receiving portion on the plug part is provided with the at least one device for pressure locking which cooperates with the holding element, which device prevents the holding element from being unlocked when there is media pressure inside the connector.

14. The connector as claimed in claim 1, wherein when the plug part and the holding element are in two-part form, at least one of the two parts is provided with an anti-rotation means.

15. The connector as claimed in claim 14, wherein the plug part is in polygonal form on an outside surface thereof in at least one portion.

16. The connector as claimed in claim 1, wherein the socket part has at least one anti-rotation means and/or positioning aid.

17. The connector as claimed in claim 11, wherein the socket part has at least one protruding element and/or at least one surface or shaping which secures against rotation or incorrect positioning.

18. The connector as claimed in claim 1, wherein the socket part consists of at least one plastic material and is provided with the at least one latching opening in the lateral surface, or is in the form of a machined part and is provided with at least one undercut surface as a latching surface for latching of the at least one latching lug of the holding arm of the at least one holding element.

19. The connector as claimed in claim 18, wherein the socket part is in the form of the machined part made of at least one metal.

20. The connector according to claim 1, wherein the holding element has an uninterrupted, continuous edge axially on both sides at the ends.

21. A connector, comprising:
at least one plug part and at least one socket part, wherein the plug part can be inserted or is inserted into a socket portion of the socket part,
wherein at least one holding element is provided for releasably holding the plug part in the socket part and wherein the plug part can be provided or is provided with the holding element,
wherein the plug part is provided with at least one device for pressure locking which cooperates with the holding element, which device prevents the holding element from being unlocked when there is media pressure inside the connector.

22. The connector as claimed in claim 21, wherein the at least one pressure locking device comprises at least one element protruding from an outside of a receiving portion of the plug part and the holding element comprises holding arms and at least one opening in at least one of the holding arms.

23. The connector as claimed in claim 22, wherein for pressure locking, the protruding element is located outside an opening in the holding element by displacement of the holding element relative to the plug part in an axial direction of the holding element and hereby blocks a radial movement of the holding arm or of the holding arms.

24. The connector as claimed in claim 22, wherein the pressure locking device comprises at least one protruding pin or at least one protruding elevation.

25. A holding element for a connector having a socket part and a plug part, wherein the plug part can be inserted or is inserted into a socket portion of the socket part, comprising:
wherein the holding element is fittable onto the plug part for releasably holding the plug part in the socket part,
wherein the holding element has a holding element body, first holding arms having latching lugs directed inwards relative to the holding element, second holding arms having latching lugs directed outwards relative to the holding element, and an uninterrupted, continuous edge axially on both sides at ends thereof,
wherein the first holding arms having latching lugs directed inwards relative to the holding element and the second holding arms having latching lugs directed outwards relative to the holding element each have a free end which is resiliently moveable in a radial direction and an opposite end which is fixed to the holding element body,
wherein a locking device is provided for securing a latching state of the plug part and the socket part and for indicating incorrect assembly thereof, wherein the locking device cooperates with the holding element, wherein the locking device is a radially insertable locking element which cooperates with the holding element in a region of the second holding arms thereof, and
wherein an actuating element projects radially outwards at free ends of the second holding arms having latching lugs directed outwardly relative to the holding element.

* * * * *